United States Patent [19]

Kubota et al.

[11] Patent Number: 4,772,522
[45] Date of Patent: Sep. 20, 1988

[54] MAGNETIC RECORDING MEDIUM

[75] Inventors: Yuichi Kubota; Masaharu Nishimatsu; Kazunori Tamazaki; Keiji Koga; Toru Shimozawa, all of Nagano, Japan

[73] Assignee: TDK Corporation, Tokyo, Japan

[21] Appl. No.: 6,432

[22] Filed: Jan. 23, 1987

[30] Foreign Application Priority Data

Jul. 21, 1986 [JP] Japan .................................. 61-171168
Jul. 28, 1986 [JP] Japan .................................. 61-177085

[51] Int. Cl.$^4$ ............................................. G11B 5/706
[52] U.S. Cl. ..................... 428/328; 252/62.54; 427/44; 427/128; 428/329; 428/408; 428/694; 428/695; 428/900
[58] Field of Search ............ 428/695, 694, 900, 425.9, 428/328, 329, 323, 408; 427/44, 128; 252/62.54; 360/134–136

[56] References Cited

U.S. PATENT DOCUMENTS

| | | | |
|---|---|---|---|
| 4,486,496 | 12/1984 | Dezawa | 428/329 |
| 4,493,874 | 1/1985 | Kubo | 428/403 |
| 4,511,617 | 4/1985 | Hideyama | 428/329 |
| 4,548,864 | 10/1985 | Nakayama | 428/694 |
| 4,555,431 | 11/1985 | Miyatsuka | 428/695 |
| 4,565,726 | 1/1986 | Oguchi | 428/329 |
| 4,584,242 | 4/1986 | Nagai | 428/403 |
| 4,585,697 | 4/1986 | Kato | 428/900 |
| 4,591,528 | 5/1986 | Nishimatsu | 428/328 |
| 4,606,971 | 8/1986 | Ido | 428/329 |
| 4,624,892 | 11/1986 | Ishizaki | 428/695 |
| 4,624,894 | 11/1986 | Kishimoto | 428/900 |
| 4,636,433 | 1/1987 | Kubo | 428/329 |
| 4,664,964 | 5/1987 | Okita | 428/900 |
| 4,666,754 | 5/1987 | Arioka | 428/695 |
| 4,677,024 | 6/1987 | Kitahata | 428/328 |
| 4,686,149 | 8/1987 | Aonuma | 427/44 |
| 4,699,840 | 10/1987 | Yashiro | 428/694 |
| 4,701,372 | 10/1987 | Akiyama | 428/694 |
| 4,720,411 | 1/1988 | Shimozawa | 428/329 |
| 4,726,990 | 2/1988 | Shimozawa | 428/329 |

FOREIGN PATENT DOCUMENTS 57-195328 12/1982 Japan .

Primary Examiner—Ellis P. Robinson
Attorney, Agent, or Firm—Oblon, Fisher, Spivak, McClelland & Maier

[57] ABSTRACT

A magnetic recording medium comprising a substrate, an optional undercoat layer, and a magnetic layer formed thereon and containing a hexagonal plate magnetic powder, an electroconductive material, and a binder is improved in runnability and recording density by the presence of a fatty acid ester at least on the recording side surface of the magnetic layer, and by providing an electric resistance of up to $5 \times 10^9$ $\Omega/cm^2$ on the side of the magnetic layer.

13 Claims, 1 Drawing Sheet

MAGNETIC RECORDING MEDIUM

CROSS REFERENCE TO THE RELATED APPLICATIONS

Reference is made to copending U.S. application Ser. No. 839,570 filed Mar. 14, 1986, for Magnetic Recording Medium; Ser. No. 849,860 filed Apr. 9, 1986, for Magnetic Recording Medium; Ser. No. 854,025 filed Apr. 21, 1986, for Coating Type Perpendicular Magnetic Recording Medium for Digital Recording; and Ser. No. 927,596 filed Nov. 6, 1986, for Magnetic Recording Medium where all applications are assigned to the same assignee as the present invention.

BACKGROUND OF THE INVENTION

This invention relates to coating type magnetic recording media having a magnetic layer containing a hexagonal crystal plate magnetic powder. More particularly, it relates to improvements in the runnability and recording density of disk-shaped magnetic recording media having a hexagonal crystal plate magnetic powder contained in the magnetic layer.

In recent years, a great demand for high density recording is imposed on magnetic recording media for the purposes of increased recording capacity and size reduction. Conventional commonly used magnetic recording media are coating type media because of productivity and many other advantages, and most of them have a magnetic layer containing needle magnetic powder such as gamma-$Fe_2O_3$ and cobalt coated gamma-$Fe_2O_3$. Magnetic recording media having such magnetic powder contained, however, have a certain limit with respect to recording density.

One approach toward a high recording density is a perpendicular recording method which utilizes the residual magnetization of a magnetic recording medium in a direction perpendicular to the surface of the medium. Known among such perpendicular magnetic recording media is a magnetic recording medium having a hexagonal crystal plate magnetic powder such as barium ferrite and strontium ferrite contained in its magnetic layer (see Japanese patent application Kokai No. 57-195328). These perpendicular magnetic recording media offer a higher recording density particularly when a magnetic powder having a reduced particle size is used. However, disk-shaped media utilizing such very finely divided magnetic powder are insufficient in runnability during their operation. Generally, the disk-shaped media are electrically charged by friction due to high speed rotation during their operation, and such frictional charging is one of the factors of prohibiting runnability improvement.

SUMMARY OF THE INVENTION

Therefore, an object of the present invention is to provide a novel and improved magnetic recording medium, particularly disk-shaped medium, exhibiting improved runnability during operation and capable of high density recording.

According to the present invention, there is provided a magnetic recording medium comprising a substrate and a magnetic layer formed on the substrate and containing a hexagonal plate magnetic powder, an electroconductive material, and a binder, wherein a fatty acid ester of a monobasic saturated or unsaturated fatty acid having 10 to 22 carbon atoms with a monohydric saturated or unsaturated alcohol having 2 to 22 carbon atoms is present at least on the surface of the magnetic layer remote from the substrate, and the medium has an electric resistance of up to $5 \times 10^9$ $\Omega/cm^2$ on the side of the magnetic layer.

In one preferred embodiment, an undercoat layer containing an electroconductive material and a binder is interposed between the substrate and the magnetic layer.

Preferably, the electroconductive material in the magnetic layer and the undercoat layer is carbon black, graphite or graphitized carbon black. The binder is a radiation curable compound. The magnetic powder is hexagonal barium ferrite.

In a further preferred embodiment, the undercoat layer is a plasma polymerized film.

BRIEF DESCRIPTION OF THE DRAWING

The above and other objects, features, and advantages of the present invention will be more readily understood by reading the following description taken in conjunction with the accompanying drawings, in which.

DETAILED DESCRIPTION OF THE INVENTION

Figure 1:
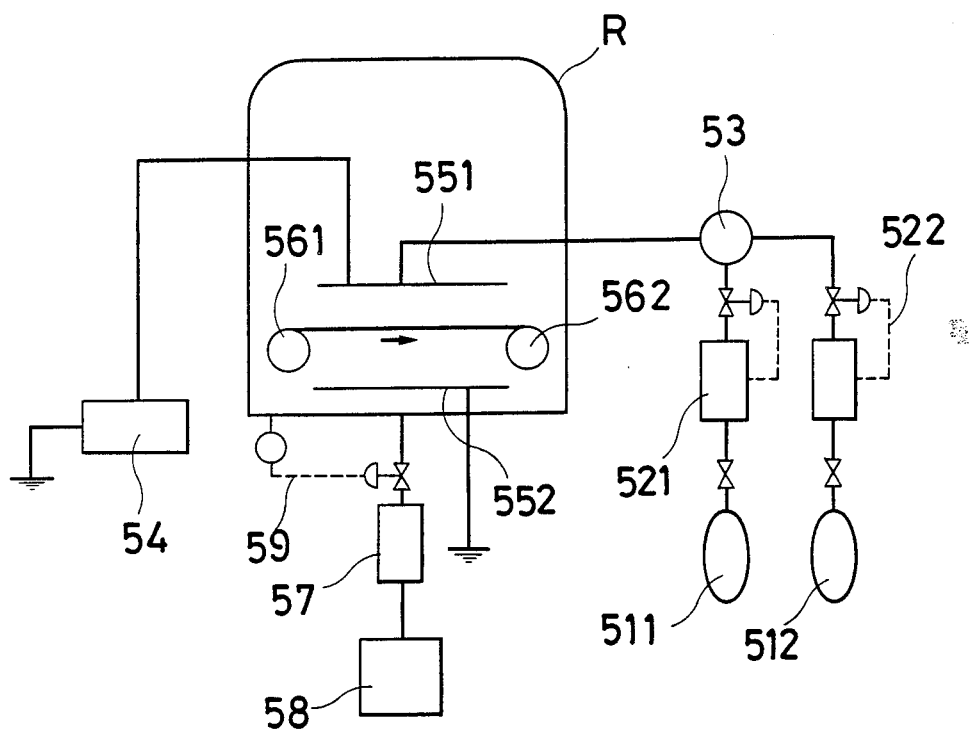
FIG. 1 is a schematic illustration of a plasma polymerizing apparatus having a d.c., a.c. or variable frequency power source.

The present invention is directed to a magnetic recording medium comprising a substrate and a magnetic layer formed thereon. An optional undercoat layer is interposed between the substrate and the magnetic layer. According to the feature of the present invention, a specific fatty acid ester is present at least on the surface of the magnetic layer remote from the substrate (to be sometimes referred to as recording surface, hereinafter). The medium has an electric resistance of up to $5 \times 10^9$ $\Omega/cm^2$ on the side of the magnetic layer.

Magnetic layer

The magnetic layer used in the present invention contains (a) a plate magnetic powder, (b) an electroconductive material (simply referred to as conductive material), and (c) a binder.

The powdery magnetic material used herein is preferably comprised of hexagonal crystal plate-shaped barium and strontium ferrites. Better electromagnetic properties are obtained when the average particle diameter is up to about 0.2 $\mu m$, preferably 0.01 to 0.15 $\mu m$. With an average particle diameter in excess of 0.2 $\mu m$, the C/N (carrier-to-noise) ratio of the resulting medium is lowered to below the commercially acceptable level. The average thickness of magnetic plates ranges from about 0.001 to about 0.1 $\mu m$. The flakiness (or flake morphology ratio) given as the average particle diameter divided by the average thickness is not critical, but is generally at least 4, preferably at least 6, and more preferably at least 10. No particular upper limit is imposed on the flakiness, but usually it is up to 60.

The average particle diameter used herein is determined by taking an electron photomicrograph of particles, for example, of hexagonal barium ferrite under either a scanning electron microscope (SEM) or a transmission electron microscope (TEM), measuring the diameter of fifty (50) particles in cross section, and averaging the measurements. It may also be obtained by measuring the half-width from an X-ray diffraction pattern. The average thickness can be determined by either of the above-mentioned measuring methods. The flakiness is then given as the average particle diameter divided by the average thickness.

The barium ferrites used herein include a hexagonal crystal barium ferrite conforming to $BaFe_{12}O_{19}$ and analogues, and partially substituted barium ferrites of the same formula wherein some Ba and Fe atoms are replaced by other metal atoms such as Ca, Sr, Pb, Co, Ni, Ti, Cr, Zn, In, Mn, Cu, Ge, Nb, Zr, Sn, etc. A mixture of them may be used. Also included are a hexagonal strontium ferrite conforming to $SrFe_{12}O_{19}$ and analogues, and similarly substituted ones. Mixtures of these barium and strontium ferrites may be used.

Barium ferrite and analogues may be prepared by any desired processes, for example, ceramic process, codeposition-sintering process, hydrothermal synthesis process, flux process, glass crystallization process, alkoxide process, and plasma jet process. These processes are described in detail in an article by Y. Koike and O. Kubo, "Ceramics", 18, No. 10 (1983).

In addition to the magnetic powder, the magnetic layer contains the conductive material. Any conductive substances may be used although carbon black, graphite, and graphitized carbon black are particularly preferred.

Exemplary of the carbon black there may be given furnace black, channel black, acetylene black, thermal black, and lamp black, and other carbon blacks prepared by any known processes, with the acetylene black, furnace black, channel black, roller and disk black, and German naphthalin blacks being most preferred.

The carbon blacks may have a particle diameter which is not particularly limited, but preferably ranges from 10 to 100 nm, more preferably from 10 to 80 nm as measured by electron photomicroscopic analysis. Carbon black having a particle diameter of more than 100 nm provides a rough surface contributing to a reduction in the electromagnetic properties of the resulting magnetic layer. Finer carbon black particles of less than 10 nm in diameter are difficult to uniformly disperse, also resulting in a medium having a rough surface.

A special type of carbon black is graphitized carbon black which may also be used in the practice of the present invention. Many graphitized carbon blacks are observed to have a shell-like structure in which carbon layer planes are disposed parallel on the surface and to have a void in a region in proximity to the internal center. Some graphitized carbon blacks are in the form of a somewhat angular hollow capsule. Because of these structural differences from carbon blacks, graphitized carbon blacks can be definitely discriminated from carbon blacks. The surface shell of graphitized carbon black is smooth or lubricating because of graphitization. The graphitized carbon black is a special type of carbon black characterized in that it has a minimized content of impurities like sulfur and chlorine which are usually contained in trace amounts in ordinary carbon black, and that it adsorbs little moisture. Although low moisture adsorption generally prevents dispersion of carbon black, unexpectedly, graphitized carbon black shows no reduction in dispersability irrespective of a low moisture content. Because of the least moisture adsorption and the very low surface friction due to the presence of a graphitized shell at the surface, the inclusion of graphitized carbon black is effective particularly when the medium is used in a high-temperature, high-humidity environment.

Carbon black has good electric conductivity. The finer the carbon black particles, the more conductive they are. Graphitized carbon black increases conductivity as its crystal structure is more graphitized. Since any volatile and oil values present on the surface of carbon black prohibit conductivity, removal thereof contributes to an increase in conductivity and is thus advantageous in an antistatic property. In this respect, the use of graphitized carbon black provides a magnetic recording medium which undergoes less dropouts.

Graphitized carbon blacks are obtained by heating carbon blacks such as acetylene black, furnace black, channel black, roller and disk black, and German naphthalin blacks at a temperature of 2,700° to 3,000° C. Generally, they have an average particle diameter of 10 to 100 nm, preferably 10 to 80 nm, a specific surface area of 20 to 300 $m^2$/gram as expressed in BET, and a volatile content of 1.0% or less. They are commercially available, for example, as #4000B manufactured by Mitsubishi Chemicals K.K. It is also preferred that the graphitized carbon black has pH 8 or higher.

The conductive material may be used in amounts of about 9 to 30 parts by weight per 100 parts by weight of the magnetic powder. The inclusion of the conductive material in excess of 30 parts per 100 parts by weight of magnetic powder provides a poorly dispersed magnetic coating composition from which a medium having a reduced surface roughness is obtained, probably adversely affecting the linear recording density properties of the medium. Less than 9 parts by weight of the conductive material cannot maintain the electric resistance within the specific range so that the medium is susceptible to frictional charging and thus deteriorated in runnability.

The medium has an electric resistance of up to $5 \times 10^9$ $\Omega/cm^2$, preferably up to $1 \times 10^9$ $\Omega/cm^2$ on the side of the magnetic layer which contains the above-mentioned magnetic powder and conductive material and the binder to be illustrated hereinafter. The features of the present invention that a specific fatty acid ester to be illustrated hereinafter is present on the surface of the magnetic layer and the medium has an electric resistance of up to $5 \times 10^9$ $\Omega/cm^2$ on the side of the magnetic layer are required to achieve minimized friction and improved durability or runnability. Particularly when hexagonal plate magnetic powder is used, no satisfactory improvement in runnability would be achieved unless both of the above-mentioned features are met.

The electric resistance of the magnetic recording medium on the side of its magnetic layer is measured according to the method for measuring the volume resistivity of electrical polyester films as prescribed in JIS C2318.

The magnetic layer which contains the magnetic powder, conductive material and binder may have any varying thickness depending on the particular shape and size of the magnetic powder used, but generally has a thickness of about 0.1 to about 5 μm, preferably about 0.1 to about 4 μm. Thicker magnetic layers outside this range have a somewhat low degree of perpendicular orientation of magnetic particles, and are thus somewhat deteriorated in surface roughness, C/N ratio, and linear recording density.

The magnetic layer may preferably have a surface roughness R20 of up to 0.08 μm, and more preferably up to 0.06 μm. The lower limit of surface roughness R20 is generally about 0.01 μm. A magnetic layer having a rough surface with an R20 of more than 0.08 μm comes in insufficient contact with a head during operation to ensure precise writing/reading, reducing C/N ratio and linear recording density.

The term surface roughness R20 used herein is a twenty-point mean surface roughness. The twenty-point mean surface roughness R20 has the same definitions and designation as the ten-point mean surface roughness R10 by JIS B 0601-1982 with the exception of increasing the number of measurement points from ten to twenty. The terms, surface roughness, profile, reference length of profile, roughness curve, cut-off value, mean line of profile, and profile peak and valley are as defined in the standard.

The twenty-point mean roughness shall be the value of difference, being expressed in micrometer (μm), between the mean value of altitudes of peaks from the highest to the 10th, measured in the direction of vertical magnification from a straight line that is parallel to the mean line and that does not intersect the profile, and the mean value of altitudes of valleys from the deepest to the 10th, within a sampled portion, of which length corresponds to the reference length, from the profile. The profile may be depicted by means of a probe meter, for example.

The twenty-point mean roughness R20 is given by the following equation:

$$R20=[(R_1+R_2+R_3+R_4+R_5+R_6+R_7+R_8+R_9+R_{10})-(R_{11}+R_{12}+R_{13}+R_{14}+R_{15}+R_{16}+R_{17}+R_{18}+R_{19}+R_{20})]/10$$

wherein $R_1$ to $R_{10}$ are altitudes of peaks from the highest to the 10th for the sampled portion corresponding to the reference length L, and $R_{11}$ to $R_{20}$ are altitudes of valleys from the deepest to the 10th for the samples portion corresponding to the reference length L. The reference length L varies with the range of the twenty-point mean roughness R20 and it is also in conformity to the standard. For example, $L=0.25$ mm when $R20 \leq 0.8$ μm.

The probe-type surface roughness meter used herein is Talystep-1 manufactured by Taylor Hobson Company. The probe having a tip size of $0.1 \times 2.5$ μm was operated under a load of 2 mg with a cut-off value of the order of 0.18 to 9 Hz (166.7 μm to 3.3 μm) at a probe speed of 30 μm/sec.

Fatty acid esters

According to the present invention, a fatty acid ester is present at least on the recording surface of the magnetic layer containing the magnetic powder, conductive material and binder.

More specifically, a fatty acid ester of a monobasic saturated or unsaturated fatty acid having 10 to 22 carbon atoms, preferably 10 to 18 carbon atoms with a monohydric saturated or unsaturated alcohol having 2 to 22 carbon atoms, preferably 2 to 18 carbon atoms is present at least on the surface of the magnetic layer remote from the substrate. Esters of fatty acids having less than 10 carbon atoms with alcohols having less than 2 carbon atoms have a too low melting point to provide lubrication, failing to improve the durability of the medium. Esters of fatty acids having more than 22 carbon atoms with alcohols having more than 22 carbon atoms have a high melting point so that their melting properties are too poor to provide lubrication, failing to improve the durability of the medium.

The aliphatic chains of the fatty acids and/or alcohols forming the esters may be either saturated or unsaturated and include normal-, iso- and other isomers.

Examples of the esters are given below.

Capric acid esters such as butyl caprate, octyl caprate, isooctyl caprate, 2-ethylhexyl caprate, decyl caprate, isodecyl caprate, lauryl caprate, tridecyl caprate, isotridecyl caprate, myristyl caprate, isotetradecyl caprate, cetyl caprate, isohexadecyl caprate, stearyl caprate, isostearyl caprate, and oleyl caprate;

Lauric acid esters such as vinyl laurate, propyl laurate, isopropyl laurate, butyl laurate, isobutyl laurate, amyl laurate, isoamyl laurate, heptyl laurate, isoheptyl laurate, octyl laurate, isooctyl laurate, 2-ethylhexyl laurate, decyl laurate, isodecyl laurate, dodecyl laurate, isododecyl laurate, tridecyl laurate, isotridecyl laurate, myristyl laurate, isomyristyl laurate, pentadecyl laurate, isopentadecyl laurate, cetyl laurate, isocetyl laurate, stearyl laurate, isostearyl laurate, oleyl laurate, ricinol laurate, and linol laurate;

Myristic acid esters such as vinyl myristate, propyl myristate, isopropyl myristate, butyl myristate, isobutyl myristate, amyl myristate, isoamyl myristate, heptyl myristate, isoheptyl myristate, octyl myristate, isooctyl myristate, 2-ethylhexyl myristate, decyl myristate, isodecyl myristate, dodecyl myristate, isododecyl myristate, tridecyl myristate, isotridecyl myristate, myristyl myristate, isomyristyl myristate, pentadecyl myristate, isopentadecyl myristate, cetyl myristate, isocetyl myristate, stearyl myristate, isostearyl myristate, oleyl myristate, ricinol myristate, and linol myristate;

Isomyristic acid esters such as propyl isomyristate, isopropyl isomyristate, butyl isomyristate, isobutyl isomyristate, amyl isomyristate, isoamyl isomyristate, heptyl isomyristate, isoheptyl isomyristate, octyl isomyristate, isooctyl isomyristate, 2-ethylhexyl isoisomyristate, decyl isomyristate, isodecyl isomyristate, dodecyl isomyristate, isododecyl isomyristate, tridecyl isomyristate, isotridecyl isomyristate, myristyl isomyristate, isomyristyl isomyristate, pentadecyl isomyristate, isopentadecyl isomyristate, cetyl isomyristate, isocetyl isomyristate, stearyl isomyristate, isostearyl isomyristate, oleyl isomyristate, ricinol isomyristate, and linol isomyristate;

Palmitic acid esters such as vinyl palmitate, propyl palmitate, isopropyl palmitate, butyl palmitate, isobutyl palmitate, amyl palmitate, isoamyl palmitate, heptyl palmitate, isoheptyl palmitate, octyl palmitate, isooctyl palmitate, 2-ethylhexyl palmitate, decyl palmitate, isodecyl palmitate, dodecyl palmitate, isododecyl palmitate, tridecyl palmitate, isotridecyl palmitate, myristyl palmitate, isomyristyl palmitate, pentadecyl palmitate, isopentadecyl palmitate, cetyl palmitate, isocetyl palmitate, stearyl palmitate, isostearyl palmitate, oleyl palmitate, ricinol palmitate, and linol palmitate;

Isopalmitic acid esters such as vinyl isopalmitate, propyl isopalmitate, isopropyl isopalmitate, butyl isopalmitate, isobutyl isopalmitate, amyl isopalmitate, isoamyl isopalmitate, heptyl isopalmitate, isoheptyl isopalmitate, octyl isopalmitate, isooctyl isopalmitate, 2-ethylhexyl isopalmitate, decyl isopalmitate, isodecyl isopalmitate, dodecyl isopalmitate, isododecyl isopalmitate, tridecyl isopalmitate, isotridecyl isopalmitate, myristyl isopalmitate, isomyristyl isopalmitate, pentadecyl isopalmitate, isopentadecyl isopalmitate, cetyl isopalmitate, isocetyl isopalmitate, stearyl isopalmitate, isostearyl isopalmitate, oleyl isopalmitate, ricinol isopalmitate, and linol isopalmitate;

Stearic acid esters such as vinyl stearate, propyl stearate, isopropyl stearate, butyl stearate, isobutyl stearate, amyl stearate, isoamyl stearate, heptyl stearate, isoheptyl stearate, octyl stearate, isooctyl stearate, 2-ethylhexyl stearate, decyl stearate, isodecyl stearate, dodecyl stearate, isododecyl stearate, tridecyl stearate, isotridecyl stearate, myristyl stearate, isomyristyl stearate, pentadecyl stearate, isopentadecyl stearate, cetyl stearate, isocetyl stearate, stearyl stearate, isostearyl stearate, oleyl stearate, ricinol stearate, and linol stearate;

Isostearic acid esters such as vinyl isostearate, propyl isostearate, isopropyl isostearate, butyl isostearate, isobutyl isostearate, amyl isostearate, isoamyl isostearate, heptyl isostearate, isoheptyl isostearate, octyl isostearate, isooctyl isostearate, 2-ethylhexyl isostearate, decyl isostearate, isodecyl isostearate, dodecyl isostearate, isododecyl isostearate, tridecyl isostearate, isotridecyl isostearate, myristyl isostearate, isomyristyl isostearate, pentadecyl isostearate, isopentadecyl isostearate, cetyl isostearate, isocetyl isostearate, stearyl isostearate, isostearyl isostearate, oleyl isostearate, ricinol isostearate, and linol isostearate;

Oleic acid esters such as butyl oleate, isobutyl oleate, amyl oleate, isoamyl oleate, heptyl oleate, isoheptyl oleate, octyl oleate, isooctyl oleate, 2-ethylhexyl oleate, decyl oleate, isodecyl oleate, dodecyl oleate, isododecyl oleate, tridecyl oleate, isotridecyl oleate, myristyl oleate, isomyristyl oleate, pentadecyl oleate, isopentadecyl oleate, cetyl oleate, isocetyl oleate, stearyl oleate, isostearyl oleate, oleyl oleate, ricinol oleate, and linol oleate;

Elaidic acid esters such as butyl elaidate, isobutyl elaidate, amyl elaidate, isoamyl elaidate, heptyl elaidate, isoheptyl elaidate, octyl elaidate, isooctyl elaidate, 2-ethylhexyl elaidate, decyl elaidate, isodecyl elaidate, dodecyl elaidate, isododecyl elaidate, tridecyl elaidate, isotridecyl elaidate, myristyl elaidate, isomyristyl elaidate, pentadecyl elaidate, isopentadecyl elaidate, cetyl elaidate, isocetyl elaidate, stearyl elaidate, isostearyl elaidate, oleyl elaidate, ricinol elaidate, and linol elaidate;

10-Octadecenoic acid esters such as butyl 10-octadecenoate, isobutyl 10-octadecenoate, amyl 10-octadecenoate, isoamyl 10-octadecenoate, heptyl 10-octadecenoate, isoheptyl 10-octadecenoate, octyl 10-octadecenoate, isooctyl 10-octadecenoate, 2-ethylhexyl 10-octadecenoate, decyl 10-octadecenoate, isodecyl 10-octadecenoate, dodecyl 10-octadecenoate, isododecyl 10-octadecenoate, tridecyl 10-octadecenoate, isotridecyl 10-octadecenoate, myristyl 10-octadecenoate, isomyristyl 10-octadecenoate, pentadecyl 10-octadecenoate, isopentadecyl 10-octadecenoate, cetyl 10-octadecenoate, isocetyl 10-octadecenoate, stearyl 10-octadecenoate, isostearyl 10-octadecenoate, oleyl 10-octadecenoate, ricinol 10-octadecenoate, and linol 10-octadecenoate;

Ricinoleic acid esters such as butyl ricinoleate, isobutyl ricinoleate, amyl ricinoleate, isoamyl ricinoleate, heptyl ricinoleate, isoheptyl ricinoleate, octyl ricinoleate, isooctyl ricinoleate, 2-ethylhexyl ricinoleate, decyl ricinoleate, isodecyl ricinoleate, dodecyl ricinoleate, isododecyl ricinoleate, tridecyl ricinoleate, isotridecyl ricinoleate, myristyl ricinoleate, isomyristyl ricinoleate, pentadecyl ricinoleate, isopentadecyl ricinoleate, cetyl ricinoleate, isocetyl ricinoleate, stearyl ricinoleate, isostearyl ricinoleate, oleyl ricinoleate, ricinol ricinoleate, and linol ricinoleate;

Linoleic acid esters such as butyl linoleate, isobutyl linoleate, amyl linoleate, isoamyl linoleate, heptyl linoleate, isoheptyl linoleate, octyl linoleate, isooctyl linoleate, 2-ethylhexyl linoleate, decyl linoleate, isodecyl linoleate, dodecyl linoleate, isododecyl linoleate, tridecyl linoleate, isotridecyl linoleate, myristyl linoleate, isomyristyl linoleate, pentadecyl linoleate, isopentadecyl linoleate, cetyl linoleate, isocetyl linoleate, stearyl linoleate, isostearyl linoleate, oleyl linoleate, ricinol linoleate, and linol linoleate.

These fatty acid esters generally have a melting point of from $-25°$ C. to $75°$ C., preferably $-25°$ C. to $65°$ C., more preferably $-20°$ C. to $45°$ C., and most preferably $-20°$ C. to $35°$ C. because such low melting esters are effective with respect to runnability or durability.

The fatty acid esters may be used alone or in admixture of two or more. They are contained in the magnetic layer in total amounts of up to 20 parts by weight, preferably from 0.1 to 15 parts by weight per 100 parts by weight of the magnetic powder.

The fatty acid esters may be used in combination with fatty acids, metal soaps of fatty acids with alkali and alkaline earth metals, silicone oil, fluoride oil, paraffin, fluid paraffin, surface active agent, and the like. Preferred examples of the fatty acids which can be combined with the present fatty acid esters are fatty acids having at least 8 carbon atoms as represented by RCOOH where R is alkyl having at least 7 carbon atoms, for example, caprylic acid, capric acid, lauric acid, myristic acid, palmitic acid, stearic acid, behenic acid, oleic acid, elaidic acid, linoleic acid, linolenic acid, and stearolic acid.

The presence of the above-specified fatty acid ester at least on the recording surface of the magnetic layer may be accomplished by a variety of methods.

In general, a magnetic coating composition is prepared by mixing and dispersing the magnetic powder, the fatty acid ester and other necessary additives in the binder to be described hereinafter and then applied onto a substrate with or without an intermediate layer.

Alternatively, a magnetic layer is previously formed on a substrate by coating a magnetic coating composition of the magnetic powder and the binder, and the fatty acid ester is applied onto the magnetic layer as a topcoat by coating or evaporation. The fatty acid ester may be entirely or locally applied over the surface of the magnetic layer as the case may be.

It is also possible to add the fatty acid ester to the magnetic coating composition so that the magnetic layer contains the ester while the ester is additionally applied onto the magnetic layer as a topcoat.

The fatty acid ester may be applied to the magnetic layer as a topcoat to an ordinary thickness using a topcoating solution containing 0.1 to 15% by weight of the ester.

The presence of a specific fatty acid ester at least on the recording surface of the magnetic layer according to the present invention contributes to a significant improvement in the runnability of the associated magnetic recording medium, which is characterized by high reliability with respect to the maintenance of information signals once recorded in the medium.

Binder

A magnetic coating composition is prepared from the plate magnetic powder and conductive material with the aid of a binder which may be selected from radiation curable resins, thermoplastic resins, thermosetting resins, and reactive resins, and mixtures thereof. The thermosetting resins and radiation curable resins are preferred because of the strength of the resultant coatings.

The thermoplastic resins used herein are resins having a softening point of lower than about 150° C., an average molecular weight of 10,000 to 200,000, and a degree of polymerization of about 200 to 2,000.

The thermosetting and reactive resins used herein have a similar degree of polymerization. Upon heating after coating and drying, they are converted through condensation, addition or other reactions into polymers having an infinite molecular weight. Preferred among them are those which do not soften or melt until they are thermally decomposed.

Some illustrative non-limiting examples of the resins include resins of condensation polymerization type such as phenol resins, epoxy resins, polyurethane resins, urea resins, butyral resins, formal resins, melamine resins, alkyd resins, silicone resins, acrylic reactive resins, polyamide resins, epoxy-polyamide resins, saturated polyester resins, and urea-formaldehyde resins; mixtures of a high molecular weight polyester resin and an isocyanate prepolymer, mixtures of a methacrylate copolymer and a diisocyanate prepolymer, mixtures of a polyester polyol and a polyisocyanate, mixtures of low molecular weight glycol/high molecular weight diol/triphenylmethane triisocyanate, etc.; mixtures of any one of the foregoing condensation polymerization resins and a crosslinking agent such as isocyanates; mixtures of a crosslinking agent and a vinyl copolymeric resin such as a vinyl chloride-vinyl acetate copolymer (which may have carboxylic units incorporated therein), a vinyl chloridevinyl alcohol-vinyl acetate copolymer (which may have carboxylic units incorporated therein), a vinyl chloridevinylidene chloride copolymer, a vinyl chloride-acrylonitrile copolymer, a vinyl butyral copolymer, a vinyl formal copolymer, etc.; mixtures of a crosslinking agent and a cellulosic resin such as nitrocellulose, cellulose acetobutyrate, etc.; mixtures of a crosslinking agent and a synthetic rubber such as butadiene-acrylonitrile, etc.; and mixtures of any of the foregoing members.

Particularly preferred are mixtures of an epoxy resin, a butyral resin, and a phenol resin; mixtures of an epoxy resin, polyvinyl methyl ether, and methylol phenol ether as disclosed in U.S. Pat. No. 3,058,844; and mixtures of a bisphenol-A epoxy resin and an acrylate or methacrylate polymer as disclosed in Japanese patent application Kokai No. 49-131101.

These thermosetting resins may generally be cured by heating in an oven at about 50° to 80° C. for about 6 to 100 hours.

Among the preferred binders are radiation-curable resins, that is, resins obtained by partially curing a radiation-curable compound.

Illustrative radiation-curable resins are thermoplastic resins having contained or incorporated in their molecule a group capable of crosslinking or polymerizing upon exposure to radiation, for example, an acrylic double bond as given by acrylic and methacrylic acids having an unsaturated double bond capable of radical polymerization and esters thereof, an allyl double bond as given by diallyl phthalate, and an unsaturated bond as given by maleic acid and maleic derivatives. Other compounds having unsaturated double bonds capable of crosslinking or polymerizing upon exposure to radiation may also be used.

Typical of the resins in the form of thermoplastic resins having contained in their molecule groups capable of crosslinking or polymerizing upon exposure to radiation are unsaturated polyester resins. Included are polyester resins having radiation-sensitive unsaturated double bonds in their molecular chain, for example, unsaturated polyester resins which may be prepared by a standard process of esterifying polybasic acids of (2) as will be described below and polyhydric alcohols into saturated polyester resins except that the polybasic acids are partially replaced by maleic acid so that the resulting polyesters may have radiationsensitive unsaturated double bonds.

The radiation-curable unsaturated polyester resins may be prepared by adding maleic acid or fumaric acid to at least one polybasic acid and at least one polyhydric alcohol, conducting dewatering or alcohol-removing reaction in a conventional manner, that is, in a nitrogen atmosphere at 180° to 200° C. in the presence of a catalyst, raising the temperature to 240° to 280° C., and conducting condensation reaction at the temperature under a vacuum of 0.5 to 1 mmHg. The amount of maleic or fumaric acid added may be 1 to 40 mol %, and preferably 10 to 30 mol % of the acid reactant in consideration of crosslinking and radiation curing properties during preparation.

Examples of the thermoplastic resins which can be modified into radiation-curable resins will be described below.

(1) Vinyl chloride copolymers

Included are vinyl chloride-vinyl acetate-vinyl alcohol copolymers, vinyl chloride-vinyl alcohol copolymers, vinyl chloride-vinyl alcohol-vinyl propionate copolymers, vinyl chloride-vinyl acetate-maleic acid copolymers, vinyl chloride-vinyl acetate-vinyl alcohol-maleic acid copolymers, vinyl chloride-vinyl acetate-OH terminated, alkyl branched copolymers, for example, VROH, VYNC, VYEGX, VERR, VYES, VMCA, VAGH, UCARMMAG 520, and UCARMAG 528 (all trade names, manufactured by U.C.C.), and analogues. These copolymers may be modified to be radiation sensitive by incorporating acrylic, maleic, or allyl double bonds. They may additionally contain carboxylic units.

(2) Saturated polyester resins

Included are saturated polyesters obtained by esterifying saturated polybasic acids such as phthalic acid, isophthalic acid, terephthalic acid, succinic acid, aidpic acid, sebasic acid, etc. with polyhydric alcohols such as ethylene glycol, diethylene glycol, glycerine, trimethylolpropane, 1,2-propylene glycol, 1,3-butanediol, dipropylene glycol, 1,4-butanediol, 1,6-hexanediol, pentaerithritol, sorbitol, neopentyl glycol, 1,4-cyclohexanedimethanol, etc., and products obtained by modifying these resins with $SO_3Na$ or the like, for example, Vyron 53S (trade name, Toyobo K.K.). They may be modified to be radiation sensitive.

(3) Polyvinyl alcohol resins

Included are polyvinyl alcohol, butyral resins, acetal resins, formal resins, and copolymers of such units. They may be modified to be radiation sensitive by acting on a hydroxyl group in them.

(4) Epoxy resins and phenoxy resins

Included are epoxy resins formed by reaction of bisphenol-A with epichlorohydrin and methyl epichlorohydrin, for example, Epicoat 152, 154, 828, 1001, 1004, and 1007 (trade names, manufactured by Shell Chemicals), DEN 431, DER 732, DER 511 and DER 331 (trade names, manufactured by Dow Chemicals), Epichlon 400 and 800 (trade names, manufactured by Dai-Nihon Ink K.K.); phenoxy resins which are epoxy resins having a high degree of polymerization, for example, PKHA, PKHC, and PKHH (trade names, manufactured by U.C.C.); and copolymers of brominated bisphenol-A with epichlorohydrin, for example, Epichlon 145, 152, 153, and 1120 (trade names, manufactured by Dai-Nihon Ink K.K.). Also included are carboxyl radical-containing derivatives of the foregoing resins. These resins may be modified to be radiation sensitive by using an epoxy group contained therein.

(5) Cellulosic derivatives

A variety of cellulosic derivatives may be used although nitrocellulose, cellulose acetobutyrate, ethyl cellulose, butyl cellulose, acetyl cellulose, and analogues are preferred. These resins may be modified to be radiation sensitive by using a hydroxyl group contained therein.

Additional examples of the resins which can be subjected to radiation sensitive modification include polyfunctional polyester resins, polyether-ester resins, polyvinyl pyrrolidone resins and derivatives (e.g., PVP-olefin copolymers), polyamide resins, polyimide resins, phenol resins, spiro-acetal resins, and acrylic resins containing at least one hydroxyl-bearing acrylate or methacrylate as a polymer component.

Examples of the elastomers and prepolymers are presented below.

(1) Polyurethane elastomers and prepolymers

Polyurethanes are very useful because of abrasion resistance and adhesion to substrates, for example, PET films. Illustrative polyurethane elastomers and prepolymers are condensation polymerization products from (a) polyfunctional isocyanates such as 2,4-toluenediisocyanate, 2,6-toluenediisocyanate, 1,3-xylenediisocyanate, 1,4-xylenediisocyanate, 1,5-naphthalenediisocyanate, m-phenylenediisocyanate, p-phenylenediisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodur L, Desmodur N (trade names, manufactured by Farbenfabriken Bayer A.G.), etc.; and (b) linear saturated polyesters as produced through polycondensation from polyhydric alcohols (such as ethylene glycol, diethylene glycol, glycerine, trimethylol propane, 1,4-butanediol, 1,6-hexanediol, pentaerythritol, sorbitol, neopentylglycol, 1,4-cyclohexanedimethylol, etc.) and saturated polybasic acids (such as phthalic acid, isophthalic acid, terephthalic acid, succinic acid, adipic acid, sebasic acid, etc.); linear saturated polyethers such as polyethylene glycol, polypropylene glycol, and polytetramethylene glycol; caprolactam; polyesters such as hydroxyl-containing acrylates and hydroxyl-containing methacrylates, and the like. It is very useful to react the isocyanate or hydroxyl terminal group of these urethane elastomers with a monomer having an acrylic or allyl double bond to modify them to be radiation sensitive. Also included are those having an OH or COOH terminal group as a polar group.

Also included are monomers having active hydrogen capable of reacting with an isocyanate group and an unsaturated double bond capable of radiation curing, for example, mono- and diglycerides of long chain fatty acids having an unsaturated double bond.

(2) Acrylonitrile-butadiene copolymerized elastomers

Acrylonitrile-butadiene copolymerized prepolymers having a hydroxyl terminal group commercially available as Poly BD Liquid Resin from Sinclair Petro-Chemical and elastomers commercially available as Hiker 1432J from Nihon Zeon K.K. are adequate because the double bond of a butadiene unit is capable of generating a radical upon exposure to radiation to facilitate crosslinking and polymerization.

(3) Polybutadiene elastomer

Low molecular weight prepolymers having a hydroxyl terminal group commercially available as Poly BD Liquid Resin R-15 from Sinclair Petro-Chemical and the like are preferred because they are compatible with thermoplastic resins. R-15 prepolymers whose molecule is terminated with a hydroxyl group can be more radiation sensitive by adding an acrylic unsaturated double bond to the molecule end, which is more advantageous as a binder component.

Also, cyclic products of polybutadienes commercially available as CBR-M901 from Nihon Synthetic Rubber K.K. offer satisfactory quality when combined with thermoplastic resins.

Additional preferred examples of the thermoplastic elastomers and prepolymers include styrene-butadiene rubbers, chlorinated rubbers, acrylic rubbers, isoprene rubbers, and cyclic products thereof (commercially available as CIR 701 from Nihon Synthetic Rubber K.K.) while elastomers, for example, epoxy-modified rubbers and internally plasticized, saturated linear polyesters (commercially available as Vyron #300 from Toyobo K.K.) may also be useful provided that they are subjected to radiation sensitive modification.

The radiation-curable compounds having unsaturated double bonds which may be used as oligomers and monomers in the present invention include styrene, ethylacrylate, ethylene glycol diacrylate, ethylene glycol dimethacrylate, diethylene glycol acrylate, diethylene glycol dimethacrylate, 1,6-hexaneglycol diacrylate, 1,6-hexaneglycol dimethacrylate, N-vinylpyrrolidone, pentaerythritol tetraacrylate (and methacrylate), pentaerythritol triacrylate (and methacrylate), trimethylolpropane triacrylate, trimethylolpropane trimethacylate, polyfunctional oligoester acrylates (e.g., Aronix M-7100, M-5400, 5500, 5700, etc., available from Toa Synthetic K.K.), acryl modified products of urethane elastomers (e.g., Nippolane 4040 available from Nippon Polyurethane K.K.), and the derivatives thereof having a functional group such as COOH incorporated therein, acrylates and methacrylates of trimethylolpropane diacrylate (methacrylate) phenol ethylene oxide adducts, compounds having a pentaerythritol fused ring represented by the following general formula and having an acryl or methacryl group or epsilon-caprolactone-acryl group attached thereto:

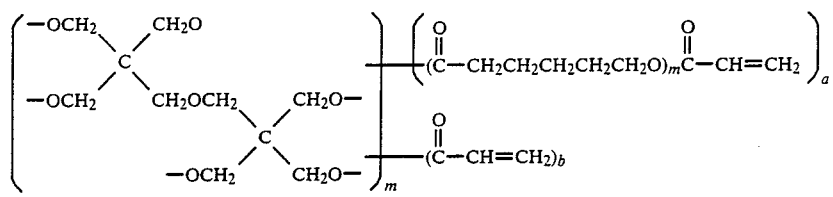

for example, compound wherein m=1, a=2, and b=4 (to be referred to as special pentaerythritol condensate A, hereinafter), compound wherein m=1, a=3, and b=3 (to be referred to as special pentaerythritol condensate B, hereinafter), compound wherein m=1, a=6, and b=0 (to be referred to as special pentaerythritol condensate C, hereinafter), and compound wherein m=2, a=6, and b=0 (to be referred to as special pentaerythritol condensate D, hereinafter), and special acrylates represented by the following general formulae:

$(CH_2=CHCOOCH_2)_3—CCH_2OH$     (1)

(Special acrylate A)

$(CH_2=CHCOOCH_2)_3—CCH_2CH_3$     (2)

(Special acrylate B)

$(CH_2=CHCO(OC_3H_6)_n—OCH_2)_3—CCH_2CH_3$     (3)

(Special acrylate C)

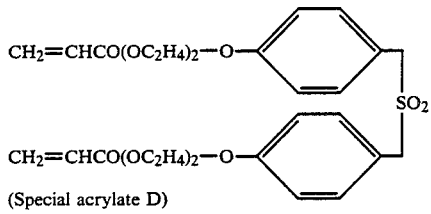

(Special acrylate D)     (4)

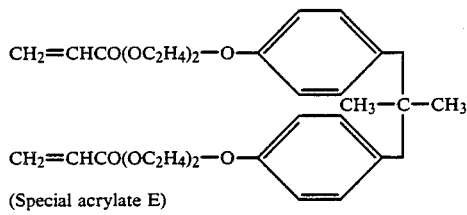

(Special acrylate E)     (5)

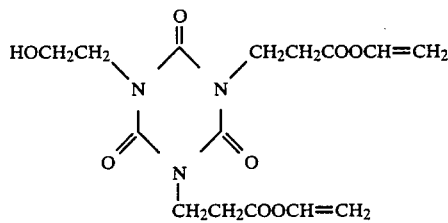

(Special acrylate F)     (6)

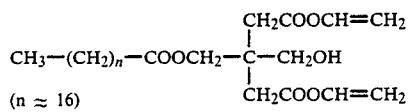

(Special acrylate G)     (7)

$CH_2=CHCOO—(CH_2CH_2O)_4—COCH=CH_2$     (8)

(Special acrylate H)

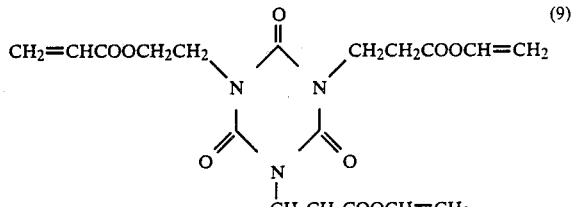

(Special acrylate I)     (9)

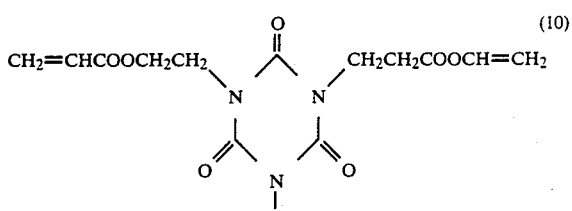

(Special acrylate J)     (10)

$$A—(X—Y)_{\overline{n}}X—A \quad (11)$$
         $|$     $|$
         A     A

A: acrylic acid    X: polyhydric acid
Y: polybasic acid    (Special acrylate K)

$A(M—N)_{\overline{n}}M—A$     (12)

A: acrylic acid M: dihydric alcohol N: dibasic acid
(Special acrylate L)

Next, processes for the synthesis of the radiation curable binders will be described.

(a) Synthesis of acryl-modified products (radiation sensitive modified resins) of vinyl chloride-vinyl acetate copolymeric resins.

A 5-liter four-necked flask is charged with 750 parts of a partially saponified vinyl chloride-vinyl acetate copolymer having an OH group (average polymerization degree n=500), 1250 parts of toluene, and 500 parts of cyclohexanone. After the flask is heated at 80° C. to dissolve the contents into a solution, 61.4 parts of 2-hydroxyethyl methacrylate adduct of tolylenediisocyanate (the preparation thereof will be described later) is added and then, 0.012 parts of tin octylate and 0.012 parts of hydroquinone are added. Reaction is continued in a nitrogen stream at 80° C. until the reaction rate of NCO reaches 90%. At the end of reaction, the reaction solution is cooled and 1250 parts of methyl ethyl ketone is added for dilution.

Preparation of 2-hydroxylethyl methacrylate (2HEMA) adduct of tolylenediisocyanate (TDI)

In a 1-liter four-necked flask, 348 parts of TDI is heated at 80° C. in a nitrogen stream. A mixture of 260 parts of 2-ethylene methacrylate, 0.07 parts of tin octylate, and 0.05 parts of hydroquinone is then added dropwise while the reactor is cooled so as to control the temperature to 80° to 85° C. After the dropwide addition, the reaction is continued to completion at 80° C. for 3 hours with stirring. At the end of reaction, the contents are taken out of the flask and cooled, obtaining a white paste-like product which is 2HEMA adduct of TDI based on the preparation method.

(b) Synthesis of acryl-modified products (radiation sensitive modified resins) of butyral resins A 5-liter four-necked flask is charged with 100 parts of a butyral resin (BM-S, manufactured by Sekisui Chemicals K.K.), 191.2 parts of toluene, and 71.4 parts of cyclohexanone. After the flask is heated at 80° C. to dissolve the contents into a solution, 7.4 parts of 2HEMA adduct of TDI (synthesized as above) is added and then, 0.015 parts of tin octylate and 0.015 parts of hydroquinone are added. Reaction is contunued in a nitrogen stream at 80° C. until the reaction rate of NCO reaches or exceeds 90%. At the end of reaction, the reaction solution is cooled and an amount of methyl ethyl ketone is added for dilution.

(c) Synthesis of acryl-modified products (radiation sensitive modified resins) of saturated polyester resins A flask is charged with 100 parts of a saturated polyester resin (Vyron RV-200, manufactured by Toyobo K.K.), 116 parts of toluene, and 116 parts of methyl ethyl ketone. After the flask is heated at 80° C. to dissolve the contents into a solution, 3.55 parts of 2HEMA adduct of TDI (synthesized as above) is added and then, 0.007 parts of tin octylate and 0.007 parts of hydroquinone are added. Reaction is continued in a nitrogen stream at 80° C. until the reaction rate of NCO reaches or exceeds 90%.

(d-1) Synthesis of acryl-modified products (radiation sensitive modified resins) of epoxy resins After 400 parts of an epoxy resin (Epicoat 1007, manufactured by Shell Chemicals) is dissolved in 50 parts of toluene and 50 parts of methyl ethyl ketone by heating, 0.006 parts of N,N-dimethylbenzylamine and 0.003 parts of hydroquinone are added. The temperature is raised to 80° C. and 69 parts of acrylic acid is added dropwise. Reaction is continued at 80° C. until the acid value is lowered to below 5.

(d-2) Synthesis of acryl-modified products (radiation sensitive modified resins) of phenoxy resins A 3-liter four-necked flask is charged with 600 parts of an OH group-bearing phenoxy resin (PKHH manufactured by U.C.C., molecular weight 30,000) and 1,800 parts of methyl ethyl ketone. After the flask is heated at 80° C. to dissolve the contents into a solution, 6.0 parts of 2HEMA adduct of TDI (synthesized as above) is added and then, 0.012 parts of tin octylate and 0.012 parts of hydroquinone are added. Reaction is continued in a nitrogen stream at 80° C. until the reaction rate of NCO reaches or exceeds 90%. The resultant modified phenoxy product has a molecular weight of 35,000 and one double bond per molecule.

(e) Synthesis of acryl-modified products (radiation sensitive modified resins) of urethane elastomers A reactor is charged with 250 parts of a urethane prepolymer of isocyanate-terminated diphenylmethane diisocyanate (MDI) type (Nippolane 3119 manufactured by Nippon Polyurethane K.K.), 32.5 parts of 2HEMA, 0.07 parts of hydroquinone, and 0.009 parts of tin octylate and heated at 80° C. to dissolve the contents into a solution. While the reactor is cooled so as to control the temperature to 80° to 90° C., 43.5 parts of TDI is added dropwise. At the end of addition, reaction is continued at 80° C. until the reaction rate reaches or exceeds 95%.

(f) Synthesis of acryl-modified products (radiation sensitive modified elastomers) of terminally urethanemodified polyether elastomers A reactor is charged with 250 parts of a polyether (PTG-500 manufactured by Nippon Polyurethane K.K.), 32.5 parts of 2HEMA, 0.07 parts of hydroquinone, and 0.009 parts of tin octylate and heated at 80° C. to dissolve the contents into a solution. While the reactor is cooled so as to control the temperature to 80° to 90° C., 43.5 parts of TDI is added dropwise. At the end of addition, reaction is continued at 80° C. until the reaction rate reaches or exceeds 95%.

(g) Synthesis of acryl-modified products (radiation sensitive modified elastomers) of polybutadiene elastomers A reactor is charged with 250 parts of a low-molecular weight, hydroxyl-terminated polybutadiene (Poly BD Liquid Resin R-15, manuactured by Sinclair Petro-Chemical), 32.5 parts of 2HEMA, 0.07 parts of hydroquinone, and 0.009 parts of tin octylate and heated at 80° C. to dissolve the contents into a solution. While the reactor is cooled so as to control the temperature to 80° to 90° C., 43.5 parts of TDI is added dropwise. At the end of addition, reaction is continued at 80° C. until the reaction rate reaches or exceeds 95%.

Among known polymers, polymers of one type degrade while polymers of another type give rise to crosslinking between molecules upon exposure to radiation.

Included in the crosslinking type are polyethylene, polypropylene, polystyrene, polyacrylate, polyacrylamide, polyvinyl chloride, polyester, polyvinyl pyrrolidone rubber, polyvinyl alcohol, and polyacrolein. Since these polymers of the crosslinking type give rise to crosslinking reaction without any particular modification as previously described, they may also be used as the radiation-curable binder as well as the above-mentioned modified products.

These radiation curable resins may be cured by any of various well-known methods.

When curing is effected with ultraviolet radiation, a photo polymerization sensitizer may be added to the radiation curable compounds as mentioned above.

The photo polymerization sensitizers used herein may be selected from well-known sensitizers. Examples of such sensitizers include benzoins such as benzoin methyl ether, benzoin ethyl ether, α-methylbenzoin, α-chlorodeoxybenzoin, etc.; ketones such as benzophenone, acetophenone, bis(dialkylamino)benzophenones; quinones such as anthraquinone and phenanthraquinone; and sulfides such as benzyl sulfide, tetramethylthiuram monosulfide, etc. The photo polymerization sensitizers may be added in amounts of 0.1 to 10% by weight based on the resin solids.

For exposure to ultraviolet radiation there may be used UV lamps such as xenon discharge lamps and hydrogen discharge lamps.

Electron radiation may also be used. Preferably, a radiation accelerator is operated at an accelerating voltage of 100 to 750 kV, more preferably 150 to 300 kV to generate radiation having a sufficient penetrating power such that the object is exposed to a radiation dose of 0.5 to 20 megarad.

Particularly preferred types of radiation for exposure include radiation generated by a radiation accelerator and ultraviolet radiation because of ease of control of a dose, simple incorporation in a manufacturing line, and electromagnetic radiation shielding.

The radiation curing process allows solventless resin compositions to cure within a short time and thus, such solvent-free resin compositions may be conveniently used in the practice of the present invention.

The use of radiation-curable resins prevents a roll of tape having a large diameter known as a jumbo roll from being tightened. Then no substantial difference in electromagnetic properties is induced between the outside and inside coils of the jumbo roll, resulting in improved properties. Besides, productivity is improved since curing can be carried out as an on-line operation in magnetic tape production.

Preferably, the weight ratio of magnetic powder to binder ranges from 1/1 to 9/1, and more preferably from 2/1 to 8/1. Weight ratios of lower than 1/1 result in a low saturation magnetic flux density. At ratios of higher than 9/1, the magnetic powder cannot be well dispersed in the binder so that the resulting coating is rough at the surface and brittle.

Additionally, any well-known thermoplastic resins may be used as the binder.

A non-reactive solvent may optionally be used in the practice of the present invention. No particular limit is imposed on the non-reactive solvent and a suitable solvent may be chosen by taking into account the solubility of and compatibility with the binder. Some illustrative nonlimiting examples of the non-reactive solvents include ketones such as acetone, methyl ethyl ketone, methyl isobutyl ketone, cyclohexanone, etc.; esters such as ethyl formate, ethyl acetate, butyl acetate, etc.; alcohols such as methanol, ethanol, isopropanol, butanol, etc.; aromatic hydrocarbons such as toluene, xylene, ethylbenzene, etc.; ethers such as isopropyl ether, ethyl ether, dioxane, etc.; and furans such as tetrahydrofuran, furfural, etc., alone or in admixture. The solvents may be used in amounts of 10 to 10,000% by weight, preferably 100 to 5,000% by weight based on the binder.

The magnetic layer may further contain an inorganic pigment. Some illustrative non-limiting examples of the inorganic pigments includes inorganic fillers such as $SiO_2$, $TiO_2$, $Al_2O_3$, $Cr_2O_3$, SiC, CaO, $CaCO_3$, zinc oxide, goethite, $\gamma$-$Fe_2O_3$, talc, kaolin, $CaSO_4$, boron nitride, graphite fluoride, molybdenum disulfide, and ZnS. Also employable are finely divided pigments such as aerosil and colloidal pigments including $SiO_2$, $Al_2O_3$, $TiO_2$, $ZrO_2$, $Cr_2O_3$, $Y_2O_3$, $CeO_2$, $Fe_3O_4$, $Fe_2O_3$, $ZrSiO_4$, $Sb_2O_5$, $SnO_2$, etc. Typical forms of these finely divided pigments are, in the case of $SiO_2$, for example, (1) colloidal solutions of ultrafine silicic acid anhydride (e.g., Snowtex, aqueous methanol silica sol manufactured by Nissan Chemicals K.K.) and (2) ultrafine anhydrous silicas prepared by pyrolysis of pure silicon tetrachloride (standard product 100 Å; Aerosil manufactured by Nihon Aerosil K.K.). Aluminum oxide, titanium oxide, and the aforementioned finely divided pigments may also be in the form of either (1) colloidal solution of ultrafine particles or (2) ultrafine particulates prepared by a gas phase process as mentioned above for silicon dioxide.

These inorganic pigments may be used in amounts of about 1 to 30 parts by weight per 100 parts by weight of the binder. The use of the inorganic pigments in excess amounts results in a brittle coating which produces more dropouts.

The inorganic pigments may preferalby have a diameter of up to 0.7 $\mu$m, more preferably up to 0.5 $\mu$m.

The magnetic layer may further contain a dispersant. Some illustrative non-limiting examples of the dispersants include organic titanium coupling agents, silane coupling agents, and surface active agents, for example, natural surface active agents also serving as an antistatic agent, such as saponin; nonionic surface active agents such as alkylene oxide, glycerine, and glycidol surface active agents; cationic surface active agents such as higher alkyl amines, quaternary ammonium salts, heterocyclic compounds (e.g. pyridine), phosphoniums and sulfoniums; anionic surface active agents containing an acidic radical such as carboxylic acid, sulfonic acid, phosphoric acid, sulfate ester radicals, and phosphate ester radicals; and amphoteric surface active agents such as amino acids, aminosulfonic acids, sulfates and phosphates of amino alcohols.

The dispersants may be used in amounts of 0.1 to 20 parts by weight per 100 parts by weight of the binder.

The substrates used herein may include films and plates of plastic materials, for example, polyesters such as polyethylene terephthalate, polyolefines such as polypropylene, cellulose derivatives such as cellulose triacetate, polyimides, polycarbonates, polysulfones, polyethylene naphthalate, aromatic aramides, aromatic polyesters; and plates of inorganic materials, for example, metal plates such as aluminum plates and glass plates, but not limited thereto. Preferred among these are polyesters, polyamides, and polyimides. The substrates are generally about 1 to 200 $\mu$m thick.

Generally, the magnetic recording medium of the present invention may have two magnetic layers on the opposite major surfaces of a substrate. Typical examples of the double magnetic layer-bearing medium are floppy disks and hard disks.

It is preferred for further improved durability to plasma treat the surface of the substrate on which the magnetic layer is to be formed or to form a plasma polymerized film on the substrate.

Undercoat

In one preferred embodiment of the magnetic recording medium according to the present invention, an undercoat layer is formed between the substrate and the magnetic layer.

Although various undercoat layers may be applicable, an undercoat layer containing a conductive material and a binder or an undercoat layer in the form of a plasma polymerized film is preferred.

In the former case, the binder and conductive material used in the undercoat layer may be selected from the available ones listed in conjunction with the magnetic layer. Preferred are undercoat compositions comprising 20 to 300 parts by weight of the conductive material and 100 parts by weight of the binder. The undercoat compositions may further contain 2 to 150 parts by weight of an inorganic pigment, especially a conductive inorganic pigment which may also be selected from the ones listed in conjunction with the magnetic layer. The undercoat layer has a thickness of the order of 10 Å to 3 $\mu$m.

Alternatively, the undercoat layer may be a plasma polymerized film. It is preferred that the plasma polymerized film is a thin film containing carbon. The film may be formed solely from carbon or from carbon and another element. In the latter case, the other element may be at least one member selected from hydrogen (H), nitrogen (N) and oxygen (O).

Because of ease of operation, the reactant gas is usually at least one member selected from methane, ethane, propane, butane, pentane, ethylene, propylene, butene, butadiene, acetylene, methylacetylene, and other saturated and unsaturated hydrocarbons which are gaseous at room temperature. If desired, a hydrocarbon which is liquid at room temperature may be used as the reactant gas. Another preferred reactant gas is a mixture of such a hydrocarbon or hydrocarbons with an inorganic gas. The inorganic gas may be selected from $H_2$, $O_2$, $O_3$, $H_2O$, $N_2$, $NO_x$ including NO, $N_2O$, and $NO_2$, $NH_3$, CO, $CO_2$, and mixtures thereof. If desired, the reactant gas may additionally contain a trace amount of a source of Si, B, P or S.

When the plasma polymerized film is formed solely of carbon, such a carbon film may be produced by subjecting a gas mixture of a gaseous hydrocarbon and a large proportion of hydrogen to plasma polymerization. The resulting carbon film changes its structure depending on such parameters as gas mixing ratio, plasma generating power, and substrate temperature.

Using these reactants, the plasma polymerized film is formed to a thickness of 5 to 80 Å. With a thickness in excess of 80 Å, internal stresses induced during film formation are left in the film to render it low in strength and the film itself is hard so that it is less durable as a flexible medium. A plasma polymerized film of less than 5 Å is too thin to exert its function. It is to be noted that the film thickness is measured using an ellipsometer or the like.

The film thickness may be controlled by changing reaction time, reactant gas flow rate and other parameters used in the plasma polymerized film producing process.

The plasma polymerized film is formed on the substrate by contacting the substrate with an electric discharge plasma of the above-mentioned reactant gas.

The principle of plasma treatment will be briefly described. When an electric field is applied to a gas kept at a reduced pressure, free electrons which are present in a minor proportion in the gas and have a remarkably greater inter-molecular distance than under atmospheric pressure are accelerated under the electric field to gain a kinetic energy (electron temperature) of 5 to 10 eV. These accelerated electrons collide against atoms and molecules to fracture their atomic and molecular orbitals to thereby dissociate them into normally unstable chemical species such as electrons, ions, neutral radicals, etc. The dissociated electrons are again accelerated under the electric field to dissociate further atoms and molecules. This chain reaction causes the gas to be instantaneously converted into highly ionized state. This is generally called a plasma. Since gaseous molecules have a less chance of collision with electrons and absorb little energy, they are kept at a temperature approximate to room temperature. Such a system in which the kinetic energy (electron temperature) of electrons and the thermal motion (gas temperature) of molecules are not correlated is designated a low temperature plasma. In this system, chemical species set up the state capable of additive chemical reaction such as polymerization while being kept relatively unchanged from the original. Substrates are plasma treated under these conditions according to the present invention. The use of a low temperature plasma avoids any thermal influence on substrates.

FIG. 1 illustrates a typical apparatus in which a plasma polymerized film is formed on the surface of a substrate. This plasma apparatus uses a variable frequency power source. The apparatus comprises a reactor vessel R into which a reactant gas or gases are introduced from a source 511 and/or 512 through a mass flow controller 521 and/or 522. When desired, different gases from the sources 511 and 512 may be mixed in a mixer 53 to introduce a gas mixture into the reactor vessel. The reactant gases each may be fed at a flow rate of 1 to 250 ml per minute.

The reactor vessel R includes means for supporting a substrate. In the illustrated embodiment, the supporting means is shown as a pair of supply and take-up rolls 561 and 562 for the purpose of treating a web substrate for magnetic tape. Depending on a particular type of the medium, any desired support means may be used, for example, a rotary support on which the substrate rests.

A pair of opposed electrodes 551 and 552 are disposed in the reactor vessel R such that the substrate is intermediate the electrodes. One electrode 551 is connected to a variable frequency power source 54 and the other electrode 552 grounded.

The reactor vessel R is further connected to a vacuum system for evacuating the vessel, including a liquefied nitrogen trap 57, an oil rotary vacuum pump 58, and a vacuum controller 59. The vacuum system has the capacity of evacuating and keeping the reactor vessel R at a vacuum of 0.01 to 10 Torr.

In operation, the reactor vessel R is first evacuated by means of the vacuum pump 58 to a vacuum of $10^{-3}$ Torr or lower before a reactant gas or gases are fed into the vessel at a predetermined flow rate. Then the interior of the reactor vessel is maintained at a vacuum of 0.01 to 10 Torr. When the flow rate of the reactant gas mixture and the rate of transfer of the substrate in the case of continuous operation become constant, the power source is turned on to generate a plasma with which a polymerized film is formed on the substrate. A carrier gas such as argon, nitrogen, helium and hydrogen may be used.

It is to be noted that other parameters including supply current and treating time may be as usual or properly selected without undue experimentation.

The plasma may be generated by microwave discharge, DC discharge, and AC discharge as well as high frequency discharge.

The resultant plasma polymerized film contains C or C and at least one of H, N, and O as described above. The carbon content is 30 to 100 atom% of the plasma polymerized film, preferably 30 to 90 atom% of the plasma polymerized film. Plasma polymerized films having a carbon content of less than 30 atom% are too weak for actual application.

At least one of H, N and O is preferably contained in addition to C such that the atomic ratio of hydrogen to carbon (H/C) is up to 1, especially from 1/6 to 1, the atomic ratio of nitrogen to carbon (N/C) is up to 3/10, especially from 1/20 to 3/10, and the atomic ratio of oxygen to carbon (O/C) is up to 3/10, especially from 1/20 to 3/10. Inclusion of H, N and/or O in addition to C improves the scratch resistance of the film.

The contents of C, H, N, O and other elements in the plasma polymerized film may be analyzed by secondary ion mass spectrometry (SIMS). Since the plasma polymerized film is 5 to 80 Å thick, C, H, N, O and other elements on the film surface may be counted by SIMS. With respect to SIMS, reference is made to the description of the chapter SIMS and LAMMA in "Hyomen Kagaku Kiso Koza (Surface Science Basic Lectures)", Vol. 3 (1984), entitled "Hyomen Bunseki no Kiso to Ouyo (Basic and Application of Surface Analysis)". Alternatively, the profile of C, H, N, O and other elements may be determined while ion etching with argon is carried out.

The plasma polymerized film is formed on a substrate, more preferably on a plasma treated substrate.

By plasma treating the substrate in advance, the bond strength between the plasma polymerized film and the substrate and hence, the magnetic layer and the substrate is improved. For the plasma treatment of a substrate, its principle, technique, and operating parameters are approximately the same as described in conjunction with the plasma polymerization. The only difference is that the plasma treatment uses in principal an inorganic gas as a treating gas although the plasma polymerization uses an organic gas (optionally in admixture with an inorganic gas) as a reactant gas.

The plasma treating gas is not particularly limited and may be $H_2$, Ar, He, $O_2$, $N_2$, air and mixtures of two or more. Preferred is an inorganic gas containing at least one of nitrogen (N), hydrogen (H), and oxygen (O). Such an inorganic gas may be suitably selected from $N_2$, $H_2$, $NH_3$, $O_2$, $O_3$, $H_2O$, and $NO_x$ including NO, $N_2O$, and $NO_2O$ and mixtures thereof. These inorganic gases may be used alone or as a mixture of two or more, or in admixture with a rare gas such as argon, helium and neon.

The frequency of the plasma treating power source is not particularly limited and may be DC, AC and microwave. Frequencies in the range of 10 kilohertz to 200 kilohertz are preferred. Plasma treatment at a frequency between 10 kHz and 200 kHz results in a drastic increase in bond strength, and hence, durability imparted to magnetic recording media.

On the undercoat layer described above, the magnetic layer previously described is formed.

If desired, the magnetic recording medium of the present invention may be provided with a backcoat. The backcoat, if formed, may preferably have a composition comprised of a binder, a pigment, and a lubricant.

The magnetic recording medium of the present invention may be prepared according to a conventional method, for example, by mixing and dispersing magnetic powder with a binder, an organic solvent, and the like to form a magnetic coating composition, applying the magnetic coating composition onto a substrate by such a technique as gravure coating, reverse-roll coating, air knife coating, air doctor coating, blade coating, kiss coating, and spray coating, effecting an optional orientation treatment in a horizontal or perpendicular magnetic field, drying, and preferably radiation curing in a conventional manner.

The orientation treatment is in accord with a conventional method. Typical orienting methods use a permanent magnet, a D.C. magnetic field, and an A.C. magnetic field, while combinations thereof, for example, a combination of vertical and horizontal magnetic fields, a combination of a permanent magnet or D.C. magnetic field with an A.C. magnetic field, mechanical orientation and combinations of mechanical orientation with any of the foregoing methods may also be employable.

The magnetic field used in the orienting treatment preferably has an intensity of 1,000 to 6,000 G.

In the practice of the present invention, a high permeability metal thin film of Permalloy or similar metal or alloy may be formed between the substrate and the magnetic layer.

As described above, there are provided magnetic recording media having improved runnability as well as high recording density property. These magnetic recording media are useful as both digital and analog recording media and find applications as various floppy disks, audio and video floppy disks, image files, computer disks, magnetic disks, magnetic cards and the like. They are particularly suitable as floppy disks, computer disks, and magnetic disks.

EXAMPLES

In order that those skilled in the art will better understand the practice of the present invention, examples of the present invention will be described below. Several abbreviations are used, for example, Hc is coercive force in oersted, MW is molecular weight, PET is polyethylene terephthalate, MEK is methyl ethyl ketone, and MIBK is methyl isobutyl ketone.

EXAMPLE 1

A series of samples were prepared by coating a polyester (PET) film of 75 μm thick on its face and rear surfaces with a magnetic coating composition as shown below to form a magnetic layer.

Formation of Magnetic Layer

Magnetic layer 1 (ML1)

A magnetic coating composition was prepared using hexagonal plate shaped barium ferrite (represented by $BaFe_{12}O_{19}$ having Ba and Fe partially replaced by Co and Ti and synthesized by a hydrothermal reaction process) having an average particle diameter of 0.09 μm, an average thickness of 0.0075 μm, and an average flakiness of 12.

| Ingredient | Parts by weight |
|---|---|
| Barium ferrite (Hc = 750 Oe) | 120 |
| α-$Al_2O_3$ (particulate, 0.5 μm) | 2 |
| Carbon black (average particle diameter 18 nm, specific surface area 260 m²/g, pH 6.5) | 20 |
| Solvent (50/50 MEK/toluene) | 100 |

These ingredients were milled for 3 hours in a ball mill to fully wet the barium ferrite. Separately, a binder composition was prepared by fully mixing the following ingredients into a solution.

| Ingredient | Parts by weight |
|---|---|
| Vinyl chloride-vinyl acetate-vinyl alcohol copolymer (containing maleic acid, MW = 40,000) | 6 (solids) |
| Acrylic double bond-incorporated vinyl chloride-vinyl acetate copolymer (containing maleic acid, MW = 20,000) | 12 (solids) |
| Acrylic double bond-incorporated polyether urethane elastomer (MW = 40,000) | 9 (solids) |
| Pentaerythritol triacrylate | 3 |
| Solvent (50/50 MEK/toluene) | 200 |
| Stearic acid | 4 |

To the solution was further added 6 parts by weight of oleyl oleate. The binder composition was added to the magnetic powder mixture in the ball mill and milled for dispersion for a further 42 hours.

Magnetic layer 2 (ML2)

The procedure of magnetic layer 1 was repeated except that the carbon black used as the conductive material was replaced by 15 parts by weight of carbon black having an average particle diameter of 30 nm, a specific surface area of 210 m²/g, and pH 7.

Magnetic layer 3 (ML3)

The procedure of magnetic layer 1 was repeated except that the carbon black used as the conductive material was replaced by 24 parts by weight of graphitized carbon black having an average particle diameter of 25 nm, a specific surface area of 150 m2/g, and pH 9.

Magnetic layer 4 (ML4)

The procedure of magnetic layer 1 was repeated except that the amount of the carbon black used as the conductive material was reduced from 20 parts by weight to 7 parts by weight.

The thus prepared magnetic coating composition was applied to either surface of a polyester (PET) film of 75 μm thick by gravure coating. The coated film was continuously moved between opposed permanent magnets of 3000 G to effect perpendicular orientation. After passage through the magnetic field, the coated film was continuously dried with hot air or under a far infrared lamp to drive off the solvent, subjected to a surface smoothening, and then exposed to electron radiation in a nitrogen atmosphere by means of an electron-curtain type electron accelerator (manufactured by ESI) operating under an accelerating voltage of 150 keV and an electrode current of 20 mA to a total dose of 5 Mrad, thereby curing the coating. At the end of drying, the coating or magnetic layer had a thickness of 3 μm.

It should be noted that the barium ferrite was measured for average particle diameter and average thickness by electron photomicrography according to the previously described method using a scanning or transmission electron microscope (SEM or TEM). The average flakiness was calculated as the average particle diameter divided by the average thickness.

The thus prepared samples were punched into a predetermined disk shape. These test samples were measured for the following properties.

(1) Electric Resistance of medium ($\Omega/cm^2$)

Measurement was made according to the method for measuring the volume resistivity of electrical polyester films as prescribed in JIS C2318.

(2) Coefficient of friction, $\mu$

While a medium sample was rotated at 300 revolutions per minute, a ferrite head was held in sliding contact with the sample under a load of 30 grams for 30 minutes. After the 30-minute sliding contact, the coefficient of friction of the sample was measured.

(3) Runnability

A sample was operated in a current floppy disk drive at room temperature.

(4) Linear recording density D50 (KFRPI)

The linear recording density D50 (KFRPI) of a sample at which the sample reduces its output (E) produced in a low recording density region to one-half (E/2) in a high recording density region was determined at 300 revolutions per minute using a ferrite head with a gap of 0.3 μm.

The results are shown in Table 1.

TABLE 1

| Sample No. | Magnetic layer | Resistance ($\Omega/cm^2$) | $\mu$ | Runnability ($\times 10^5$ passes) | D50 (KFRPI) |
|---|---|---|---|---|---|
| 101 | ML1 | $1 \times 10^6$ | 0.18 | 1800 | 68 |
| 102 | ML2 | $7 \times 10^7$ | 0.20 | 1400 | 73 |
| 103 | ML3 | $\leq 10^6$ | 0.18 | 2100 | 65 |
| 104* | ML4 | $3 \times 10^{13}$ | 0.41 | 200 | 77 |

*Sample No. 104 is outside the scope of the invention.

Example 2

The procedure of Example 1 using magnetic layer 1 (ML1) was repeated. In this example, the binder composition used in ML1 was replaced by the following composition and 6 parts by weight of oleyl oleate used as the lubricant was replaced by esters 1 to 5 identified below.

The binder composition used was formulated below.

| Ingredient | Parts by weight |
|---|---|
| Vinyl chloride-vinyl acetate-vinyl alcohol copolymer (containing 0.8% maleic acid, MW = 30,000) | 18 (solids) |
| Acrylic double bond-incorporated polyether urethane elastomer (MW = 50,000) | 12 (solids) |
| Solvent (50/50 MEK/toluene) | 200 |
| Stearic acid | 2 |
| Oleic acid | 2 |

The following esters were used as the lubricant additive in the described amounts.

| | |
|---|---|
| Ester 1 (Es1) | |
| Heptyl caprate | 6 parts by weight |
| Ester 2 (Es2) | |
| Isocetyl stearate | 3 parts by weight |
| Butyl stearate | 3 parts by weight |
| Ester 3 (Es3) | |
| Octyl stearate | 6 parts by weight |
| Ester 4 (Es4) | |
| Propyl caproate | 6 parts by weight |
| Ester 5 (Es5) | |
| Docosyl lignocerate | 6 parts by weight |

Esters 1-3 are within and esters 4-5 are outside the scope of the invention.

If desired, one of the above-listed esters 1 to 3 was dissolved in isopropyl alcohol to form a 4 wt % coating solution, which was applied onto the magnetic layer to form a topcoat as reported in Table 2.

The thus prepared samples were punched into the predetermined disk shape and measured for the properties as in Example 1.

The results are shown in Table 2.

TABLE 2

| Sample No. | Ester in ML1 | Topcoat | Resistance ($\Omega/cm^2$) | $\mu$ | Runnability ($\times 10^5$ passes) | D50 (KFRPI) |
|---|---|---|---|---|---|---|
| 201 | Es1 | no | $1 \times 10^6$ | 0.19 | 1300 | 68 |
| 202 | Es1 | Es2 | $1 \times 10^6$ | 0.15 | 2290 | 68 |
| 203 | Es2 | no | $1 \times 10^6$ | 0.17 | 1800 | 68 |
| 204 | Es2 | Es3 | $1 \times 10^6$ | 0.14 | 2670 | 68 |
| 205 | Es3 | no | $1 \times 10^6$ | 0.18 | 1600 | 68 |
| 206 | Es3 | Es1 | $1 \times 10^6$ | 0.16 | 2200 | 68 |
| 207 | Es3 | Es2 | $1 \times 10^6$ | 0.14 | 2590 | 68 |
| 208* | Es4 | no | $1 \times 10^6$ | 0.50 | 50 | 50 |
| 209* | Es5 | no | $1 \times 10^6$ | 0.50 | 70 | 50 |

TABLE 2-continued

| Sample No. | Ester in ML1 | Top-coat | Resistance (Ω/cm²) | μ | Runnability (× 10⁵ passes) | D50 (KFRPI) |
|---|---|---|---|---|---|---|
| 210* | — | no | 1 × 10⁶ | UM | ≦1 | 68 |

*Comparison
UM is unmeasurable.

Example 3

The procedure of Example 1, Sample No. 101 was repeated except that various magnetic powders having the average particle diameter and flakiness listed in Table 3 were used.

The resulting samples were measured for the same properties as in Example 1, with the results shown in Table 3.

TABLE 3

| Sample No. | Magnetic powder APD (μm) | Flak | Resistance (Ω/cm²) | μ | Runnability (× 10⁵ passes) | D50 (KFRPI) |
|---|---|---|---|---|---|---|
| 301 | 0.10 | 2 | 2 × 10⁶ | 0.25 | 600 | 48 |
| 302 | 0.10 | 4 | 2 × 10⁶ | 0.22 | 1000 | 58 |
| 303 | 0.10 | 5 | 2 × 10⁶ | 0.20 | 1400 | 63 |
| 304 | 0.10 | 6 | 2 × 10⁶ | 0.19 | 1500 | 69 |
| 305 | 0.10 | 8 | 2 × 10⁶ | 0.18 | 1700 | 72 |
| 306 | 0.10 | 10 | 3 × 10⁶ | 0.18 | 1800 | 76 |
| 307 | 0.10 | 15 | 3 × 10⁶ | 0.18 | 1800 | 81 |
| 308 | 0.10 | 20 | 3 × 10⁶ | 0.16 | 2000 | 84 |
| 309 | 0.10 | 25 | 4 × 10⁶ | 0.16 | 2200 | 85 |
| 310 | 0.10 | 40 | 4 × 10⁶ | 0.16 | 2500 | 88 |

Example 4

The procedure of Example 1, Sample No. 101 was repeated except that the binder used had the following formulation.

| Ingredient | Parts by weight |
|---|---|
| Vinyl chloride-vinyl acetate-vinyl alcohol copolymer (UCARMAG 528, Union Carbide Corp.) | 15 (solids) |
| Urethane (Nippolane 3022, Nihon Polyurethane K.K.) | 15 (solids) |
| Solvent (70/30 MEK/cyclohexanone) | 200 |
| Higher fatty acid-modified silicone oil | 3 |
| Butyl myristate | 3 |

These ingredients were mixed to form the binder composition. After dispersion into the magnetic coating composition, 5 parts by weight (calculated as solids) of an isocyanate compound (Colonate L, Nihon Polyurethane K.K.) was added to the magnetic coating composition.

The thus prepared magnetic coating composition was applied to either surface of a polyester film by gravure coating. The coated film was dried with hot air or under a far infrared lamp to drive off the solvent and then surface smoothened. Thereafter, the coating was thermoset by heating at 80° C. for 48 hours.

The thus prepared sample was punched into a predetermined disk shape. This test sample is designated Sample No. 401.

The coated webs corresponding to Sample Nos. 101 and 401 were produced in the form of a jumbo roll by winding the web of 5000 m long on a take-up roll of 8 inches in diameter. Test specimens were cut out from inside and outside turns and determined for resolution in percent. The resolution was determined by the following procedure.

Resolution

In the above-mentioned measurement of linear recording density D50, the resolution of 48 KFRPI/12 KFRPI was calculated. The measured resolution of sample No. 101 was assumed to be 100% and measurements of other samples are calculated in percent on this basis.

The results are shown below.

| Sample | Resolution, % Outside | Resolution, % Inside |
|---|---|---|
| No. 101 | 100 | 100 |
| No. 401 | 96 | 86 |

As seen from these data, sample No. 401 using a thermosetting resin binder composition exhibits a reduction in resolution, particularly on the inside, due to tightening of a jumbo roll during the thermosetting process.

EXAMPLE 5

Samples were prepared by substantially the same procedure as in Example 1, Sample No. 101 except that the magnetic layer was formed to different thicknesses as shown in Table 5. They were determined for D50, with the results shown in Table 5.

TABLE 5

| Sample No. | Magnetic layer thickness (μm) | D50 (KFRPI) |
|---|---|---|
| 501 | 1.0 | 75 |
| 502 | 1.5 | 71 |
| 503(= 101) | 3 | 68 |
| 504 | 4 | 68 |
| 505 | 5 | 68 |
| 506 | 8 | 40 |

Example 6

A series of samples were prepared by coating a polyester (PET) film of 75 μm thick on its face and rear surfaces with an undercoat layer selected from the followings.

| Undercoat layer 1 (UC1) | |
|---|---|
| Ingredient | Parts by weight |
| Carbon black average particle diameter: 25 nm specific surface area: 150 m²/g in BET pH: 7 | 50 |
| (A) Acryl-modified vinyl chloride-vinyl acetate-vinyl alcohol copolymer (MW = 45,000) | 45 |
| (B) Acryl-modified polyurethane elastomer (MW = 5,000) | 45 |
| (C) Pentaerythritol triacrylate | 10 |
| Stearic acid | 2 |
| Butyl stearate | 2 |
| Mixed solvent (1/1 MIBK/toluene) | 300 |

The mixture was milled for dispersion for 5 hours in a ball mill and applied to the PET film so as to give a dry thickness of 0.7 μm. The coating was surface smoothened and exposed to electron radiation in a nitrogen atmosphere by means of an electron-curtain type electron accelerator (manufactured by ESI) operating under an accelerating voltage of 150 keV and an electrode current of 10 mA to an absorption dose of 5 Mrad, thereby curing the coating to form an undercoat.

Undercoat layer 2 (UC2)

It was the same as undercoat layer 1 except that the carbon black used as the conductive material was replaced by 65 parts by weight of carbon black having the following shape and physical properties.
average particle diameter: 18 nm specific surface area: 260 m²/g in BET
pH: 6.5

Undercoat layer 3 (UC3)

It was the same as undercoat layer 1 except that the carbon black used as the conductive material was replaced by 80 parts by weight of carbon black having the following shape and physical properties.
average particle diameter: 20 nm
specific surface area: 80 m²/g in BET
pH: 9

| Undercoat layer 4 (UC4) | |
| --- | --- |
| Ingredient | Parts by weight |
| CaCO₃ (particle diameter 50 nm) | 10 |
| Graphitized carbon black average particle diameter: 25 nm specific surface area: 150 m²/g in BET pH: 9 | 30 |
| Vinyl chloride-vinyl alcohol copolymer (VAGH, Union Carbide Corp.) | 50 |
| Polyurethane elastomer (Estan 5703, B. F. Goodrich Co.) | 50 |
| Stearic acid | 2 |
| Butyl stearate | 2 |
| Mixed solvent (1/1 MIBK/toluene) | 300 |

The mixture was milled for dispersion for 5 hours in a ball mill, combined with 20 parts by weight of an isocyanate comound (Colonate L, Nihon Polyurethane K.K.), and then applied to the PET film so as to give a dry thickness of 3 μm. The coating was surface smoothened and then thermoset at 80° C. for 48 hours, thereby curing the coating to form an undercoat.

The samples were prepared by further coating the surface of each of the undercoat layers on the base film with a magnetic coating composition as shown below to form a magnetic layer.

Formation of Magnetic Layer

Magnetic layer 1 (ML1)

A magnetic coating composition was prepared using hexagonal plate shaped barium ferrite (represented by BaFe₁₂O₁₉ having Ba and Fe partially replaced by Co and Ti and synthesized by a hydrothermal reaction process) having an average particle diameter of 0.09 μm, an average thickness of 0.0075 μm, and an average flakiness of 12.

| Ingredient | Parts by weight |
| --- | --- |
| Barium ferrite (Hc = 750 Oe) | 120 |
| α-Al₂O₃ (particulate, 0.5 μm) | 2 |
| Carbon black average particle diameter: 18 nm specific surface area: 260 m²/g pH: 6.5 | 20 |
| Solvent (50/50 MEK/toluene) | 100 |

These ingredients were milled for 3 hours in a ball mill to fully wet the barium ferrite. Separately, a binder composition was prepared by fully mixing the following ingredients into a solution.

| Ingredient | Parts by weight |
| --- | --- |
| Vinyl chloride-vinyl acetate-vinyl alcohol copolymer (containing maleic acid, MW = 40,000) | 6 (solids) |
| Acrylic double bond-incorporated | 12 (solids) |
| vinyl chloride-vinyl acetate copolymer (containing maleic acid, MW = 20,000) | |
| Acrylic double bond-incorporated polyether urethane elastomer (MW = 40,000) | 9 (solids) |
| Pentaerythritol triacrylate | 3 |
| Solvent (50/50 MEK/toluene) | 200 |
| Stearic acid | 4 |

To the solution was further added 6 parts by weight of oleyl oleate. The binder composition was added to the magnetic powder mixture in the ball mill and milled for dispersion for a further 42 hours.

Magnetic layer 2 (ML2)

The procedure of magnetic layer 1 was repeated except that the carbon black used as the conductive material was replaced by 15 parts by weight of carbon black having an average particle diameter of 30 nm, a specific surface area of 210 m²/g, and pH 7.

Magnetic layer 3 (ML3)

The procedure of magnetic layer 1 was repeated except that the carbon black used as the conductive material was replaced by 24 parts by weight of graphitized carbon black having an average particle diameter of 25 nm, a specific surface area of 150 m²/g, and pH 9.

Magnetic layer 4 (ML4)

The procedure of magnetic layer 1 was repeated except that the amount of the carbon black used as the conductive material was reduced from 20 parts by weight to 7 parts by weight.

The thus prepared magnetic coating composition was applied to either surface of the undercoated polyester film by gravure coating. The coated film was continuously moved between opposed permanent magnets of 3000 G to effect perpendicular orientation. After passage through the magnetic field, the coated film was continuously dried with hot air or under a far infrared lamp to drive off the solvent, subjected to a surface smoothening, and then exposed to electron radiation in a nitrogen atmosphere by means of an electron-curtain type electron accelerator (manufactured by ESI) operating under an accelerating voltage of 150 keV and an electrode current of 20 mA to a total dose of 5 Mrad, thereby curing the coating. At the end of drying, the coating or magnetic layer had a thickness of 3 μm.

It should be noted that the barium ferrite was measured for average particle diameter and average thickness by electron photomicrography according to the previously described method using a scanning or transmission electron microscope (SEM or TEM). The average flakiness was calculated as the average particle diameter divided by the average thickness.

The thus prepared samples were punched into a predetermined disk shape. These test samples were measured for the following properties.

(1) Electric Resistance of medium (Ω/cm²)

Measurement was made according to the method for measuring the volume resistivity of electrical polyester films as prescribed in JIS C2318.

(2) Coefficient of friction, μ

While a medium sample was rotated at 300 revolutions per minute, a ferrite head was held in sliding contact with the sample under a load of 30 grams for 30 minutes. After the 30-minute sliding contact, the coefficient of friction of the sample was measured.

(3) Runnability

A sample was operated in a current floppy disk drive at room temperature.

(4) Linear recording density D50 (KFRPI)

The linear recording density D50 (KFRPI) of a sample at which the sample reduces its output (E) produced in a low recording density region to one-half (E/2) in a high recording density region was determined at 300 revolutions per minute using a ferrite head with a gap of 0.3 μm.

The results are shown in Table 6.

It should be noted that Sample Nos. 605 and 606 had no undercoat layer.

TABLE 6

| Sample No. | Undercoat | Magnetic layer | Resistance (Ω/cm²) | μ | Runnability (× 10⁵ passes) | D50 (KFRPI) |
|---|---|---|---|---|---|---|
| 601 | UC1 | ML1 | ≦10⁶ | 0.16 | 3500 | 68 |
| 602 | UC1 | ML2 | ≦10⁶ | 0.18 | 3100 | 73 |
| 603 | UC1 | ML3 | ≦10⁶ | 0.16 | 3800 | 65 |
| 604* | UC1 | ML4 | 9 × 10⁹ | 0.30 | 600 | 77 |
| 605 | UC1 | ML1 | 10⁶ | 0.18 | 1800 | 68 |
| 606* | UC1 | ML4 | 3 × 10¹³ | 0.41 | 200 | 77 |
| 607 | UC2 | ML1 | ≦10⁶ | 0.46 | 3500 | 68 |
| 608 | UC3 | ML1 | ≦10⁶ | 0.16 | 3500 | 68 |
| 609 | UC4 | ML1 | ≦10⁶ | 0.16 | 3500 | 65 |

*comparison

EXAMPLE 7

Following the undercoating procedure of Example 6, undercoat layer 1 used in Example 6 was formed on either surface of the same base film.

Thereafter, a magnetic layer as shown below is formed on the surface of each of the undercoat layers. That is, the procedure of Example 6 using magnetic layer 1 (ML1) was repeated. In this example, the binder composition used in ML1 was replaced by the following composition and 6 parts by weight of oleyl oleate used as the lubricant was replaced by esters 1 to 5 identified below.

The binder composition used was formulated below.

| Ingredient | Parts by weight |
|---|---|
| Vinyl chloride-vinyl acetate-vinyl alcohol copolymer (containing 0.8% maleic acid, MW = 30,000) | 18 (solids) |
| Acrylic double bond-incorporated polyether urethane elastomer (MW = 50,000) | 12 (solids) |
| Solvent (50/50 MEK/toluene) | 200 |
| Stearic acid | 2 |
| Oleic acid | 2 |

The following esters were used as the lubricant additive in the described amounts.

| Ester 1 (Es1) | |
|---|---|
| Heptyl caprate | 6 parts by weight |
| Ester 2 (Es2) | |
| Isocetyl stearate | 3 parts by weight |
| Butyl stearate | 3 parts by weight |
| Ester 3 (Es3) | |
| Octyl stearate | 6 parts by weight |
| Ester 4 (Es4) | |
| Propyl caproate | 6 parts by weight |
| Ester 5 (Es5) | |
| Docosyl lignocerate | 6 parts by weight |

Esters 1-3 are within and esters 4-5 are outside the scope of the invention.

If desired, one of the above-listed esters 1 to 3 was dissolved in isopropyl alcohol to form a 4 wt % coating solution, which was applied onto the magnetic layer to form a topcoat as reported in Table 7.

The thus prepared samples were punched into the predetermined disk shape and measured for the properties as in Example 6.

The results are shown in Table 7.

TABLE 7

| Sample No. | Ester in ML1 | Topcoat | Resistance (Ω/cm²) | μ | Runnability (× 10⁵ passes) | D50 (KFRPI) |
|---|---|---|---|---|---|---|
| 701 | Es1 | no | ≦10⁶ | 0.17 | 3000 | 68 |
| 702 | Es1 | Es2 | ≦10⁶ | 0.13 | 4000 | 68 |
| 703 | Es2 | no | ≦10⁶ | 0.15 | 3500 | 68 |
| 704 | Es2 | Es3 | ≦10⁶ | 0.12 | 4400 | 68 |
| 705 | Es3 | no | ≦10⁶ | 0.16 | 3300 | 68 |
| 706 | Es3 | Es1 | ≦10⁶ | 0.14 | 3900 | 68 |
| 707 | Es3 | Es2 | ≦10⁶ | 0.12 | 4300 | 68 |
| 708* | Es4 | no | ≦10⁶ | 0.50 | 50 | 50 |
| 709* | Es5 | no | ≦10⁶ | 0.50 | 70 | 50 |
| 710* | — | no | ≦10⁶ | UM | ≦1 | 68 |

*Comparison
UM is unmeasurable.

Example 8

The procedure of Example 6, Sample No. 601 was repeated except that various magnetic powders having the average particle diameter (APD) and flakiness listed in Table 8 were used.

The resulting samples were measured for the same properties as in Example 6, with the results shown in Table 8.

TABLE 8

| Sample No. | Magnetic powder APD (μm) | Flak | Resistance (Ω/cm²) | μ | Runnability (× 10⁵ passes) | D50 (KFRPI) |
|---|---|---|---|---|---|---|
| 801 | 0.10 | 2 | ≦10⁶ | 0.23 | 1200 | 48 |
| 802 | 0.10 | 4 | ≦10⁶ | 0.20 | 2700 | 58 |
| 803 | 0.10 | 5 | ≦10⁶ | 0.18 | 3100 | 63 |
| 804 | 0.10 | 6 | ≦10⁶ | 0.17 | 3500 | 69 |
| 805 | 0.10 | 8 | ≦10⁶ | 0.16 | 3700 | 72 |
| 806 | 0.10 | 10 | ≦10⁶ | 0.16 | 4000 | 76 |
| 807 | 0.10 | 15 | ≦10⁶ | 0.16 | 4300 | 81 |
| 808 | 0.10 | 20 | ≦10⁶ | 0.14 | 4500 | 84 |
| 809 | 0.10 | 25 | ≦10⁶ | 0.14 | 4700 | 85 |
| 810 | 0.10 | 40 | ≦10⁶ | 0.14 | 5000 | 88 |

Example 9

The procedure of Example 6, Sample No. 601 was repeated except that the binder user had the following formulation.

| Ingredient | Parts by weight |
|---|---|
| Vinyl chloride-vinyl acetate-vinyl alcohol copolymer (UCARMAG 528, Union Carbide Corp.) | 15 (solids) |
| Urethane (Nippolane 3022, Nihon Polyurethane K.K.) | 15 (solids) |
| Solvent (70/30 MEK/cyclohexanone) | 200 |
| Higher fatty acid-modified silicone oil | 3 |
| Butyl myristate | 3 |

These ingredients were mixed to form the binder composition. After dispersion into the magnetic coating composition, 5 parts by weight (calculated as solids) of an isocyanate compound (Colonate L, Nihon Polyurethane K.K.) was added to the magnetic coating composition.

The thus prepared magnetic coating composition was applied to either surface of a polyester film by gravure coating. The coated film was dried with hot air or under a far infrared lamp to drive off the solvent and then surface smoothened. Thereafter, the coating was thermoset by heating at 80° C. for 48 hours.

The thus prepared sample was punched into a predetermined disk shape. This test sample is designated Sample No. 901.

The coated webs corresponding to Sample Nos. 601 and 901 were produced in the form of a jumbo roll by winding the web of 5000 m long on a take-up roll of 8 inches in diameter. Test specimens were cut out from inside and outside turns and determined for resolution in percent. The resolution was determined by the following procedure. Resolution In the above-mentioned measurement of linear recording density D50, the resolution of 48 KFRPI/12 KFRPI was calculated. The measured resolution of sample No. 601 was assumed to be 100% and measurements of other samples are calculated in percent on this basis.

The results are shown below.

| Sample | Resolution, % | |
|---|---|---|
|  | Outside | Inside |
| No. 601 | 100 | 100 |
| No. 901 | 96 | 86 |

As seen from these data, sample No. 901 using a thermosetting resin binder composition exhibits a reduction in resolution, particularly on the inside, due to tightening of a jumbo roll during the thermosetting process.
Example 10

A substrate in the form of a PET film which was the same as in Example 6 was continuously moved through a vacuum chamber which was once evaluated to a vacuum of $10^{-3}$ Torr. An argon carrier gas containing 10% by volume of oxygen was then passed at a flow rate of 50 ml/minute so as to maintain a gas pressure of 0.1 Torr while a voltage was applied at a high frequency of 100 kHz to produce a plasma, thereby plasma treating the opposite surfaces of the substrate.

Thereafter, a plasma polymerized film was formed on either surface of the substrate under the following conditions.

The plasma polymerized films were subjected to elemental analysis by SIMS and measured for thickness by means of an ellipsometer. The results are shown below.

| | Plasma polymerized film | | |
|---|---|---|---|
| | A | B | C |
| Conditions | | | |
| Reactant gas | CH$_4$ 100 SCCM* | CH$_4$ 50 SCCM NH$_3$ 50 SCCM | C$_2$H$_2$ 75 SCCM NO$_2$ 25 SCCM |
| Carrier gas, Ar | 50 SCCM | 50 SCCM | 50 SCCM |
| Operating pressure | 0.1 Torr | 0.1 Torr | 0.1 Torr |
| Plasma power | 200 W | 200 W | 200 W |
| Plasma frequency | 13.56 MHz | 13.56 MHz | 13.56 MHz |
| Film | | | |
| Thickness | 30Å | 25Å | 40Å |
| Composition | H/C = 1/2 | H/C = 3/10 N/C = 8/100 | H/C = 4/10 N/C = 1/10 |
| | | | O/C = 15/100 |

*SCCM = Standard Cubic Centimeter per Minute

The magnetic layers (ML1 to ML4) used in Example 6 were formed on the surface of the plasma polymerized films on the base film.

The thus prepared samples were punched into the predetermined disk shape. These test samples were measured for the same properties as in Example 6.

TABLE 10

| Sample No. | Magnetic layer | Plasma film | Resistance ($\Omega$/cm$^2$) | $\mu$ | Runnability ($\times 10^5$ passes) | D50 (KFRPI) |
|---|---|---|---|---|---|---|
| 1001 | ML1 | A | 1 × 10$^6$ | 0.18 | 3500 | 68 |
| 1002 | ML2 | A | 7 × 10$^7$ | 0.20 | 3100 | 73 |
| 1003 | ML3 | A | ≦10$^6$ | 0.18 | 3800 | 65 |
| 1004* | ML4 | A | 3 × 10$^{13}$ | 0.41 | 600 | 77 |
| 1005 | ML1 | A | 1 × 10$^6$ | 0.18 | 1800 | 68 |
| 1006* | ML4 | A | 3 × 10$^{13}$ | 0.20 | 200 | 73 |
| 1007 | ML1 | B | 1 × 10$^6$ | 0.18 | 3500 | 68 |
| 1008 | ML1 | C | 1 × 10$^6$ | 0.18 | 3700 | 68 |

*comparison

EXAMPLE 11

The procedure of Example 10, Sample No. 1001 was repeated except that 6 parts by weight of oleyl oleate used as the lubricant in magnetic layer 1 was replaced by esters 1-5 used in Example 7. The remaining parameters used were the same as in Sample No. 1001. These samples are designated Sample Nos. 1101 to 1109.

Similar samples designated Sample Nos. 1110 to 1112 were prepared except that the undercoat layers were omitted.

The thus fabricated samples were punched into the predetermined disk shape. These test samples were evaluated for the same properties as in Example 6.

The results are shown in Table 11.

TABLE 11

| Sample No. | Ester in ML1 | Top-coat | Resistance ($\Omega$/cm$^2$) | $\mu$ | Runnability ($\times 10^5$ passes) | D50 (KFRPI) |
|---|---|---|---|---|---|---|
| 1101 | Es1 | no | 1 × 10$^6$ | 0.18 | 3000 | 68 |
| 1102 | Es1 | Es2 | 1 × 10$^6$ | 0.14 | 4000 | 68 |
| 1103 | Es2 | no | 1 × 10$^6$ | 0.20 | 3500 | 68 |
| 1104 | Es2 | Es3 | 1 × 10$^6$ | 0.17 | 4400 | 68 |
| 1105 | Es3 | no | 1 × 10$^6$ | 0.18 | 3300 | 68 |
| 1106 | Es3 | Es1 | 1 × 10$^6$ | 0.16 | 3900 | 68 |
| 1107 | Es3 | Es2 | 1 × 10$^6$ | 0.14 | 4300 | 68 |
| 1108* | Es4 | no | 1 × 10$^6$ | 0.50 | 50 | 50 |
| 1109* | — | no | 1 × 10$^6$ | UM | ≦1 | 68 |
| 1110 | Es1 | no | 1 × 10$^6$ | 0.19 | 1300 | 68 |
| 1111 | Es1 | Es2 | 1 × 10$^6$ | 0.15 | 2290 | 68 |
| 1112* | — | no | 1 × 10$^6$ | UM | ≦1 | 68 |

*Comparison
UM is unmeasurable.

Example 12

Samples were prepared by substantially the same procedure as in Example 6, Sample No. 601 except that the magnetic layer was formed to different thicknesses as shown in Table 12. They were determined for D50, with the results shown in Table 12.

TABLE 12

| Sample No. | Magnetic layer thickness ($\mu$m) | D50 (KFRPI) |
|---|---|---|
| 1201 | 1.0 | 76 |

TABLE 12-continued

| Sample No. | Magnetic layer thickness (μm) | D50 (KFRPI) |
| --- | --- | --- |
| 1202 | 1.5 | 72 |
| 1203(= 601) | 3 | 69 |
| 1204 | 4 | 69 |
| 1205 | 5 | 69 |
| 1206 | 8 | 41 |

The foregoing demonstrates the effectiveness of the present invention.

Although the present invention has been described with reference to particular embodiments, modifications and changes may be made thereto without departing from the scope of the present invention.

We claim:

1. A magnetic recording medium comprising a substrate and a magnetic layer formed on the substrate and containing a hexagonal plate magnetic powder having an average particle diameter of 0.01 to 0.2 μm and a flakiness of at least 4, 9 to 30 parts by weight per 100 parts by weight of the magnetic powder of an electroconductive material, and a binder, wherein a fatty acid ester of a monobasic saturated or unsaturated fatty acid having 10 to 22 carbon atoms with a monohydric saturated or unsaturated alcohol having 2 to 22 carbon atoms is present at least on the surface of the magnetic layer remote from the substrate, and the medium has an electric resistance of up to $5 \times 10^9 \Omega/cm^2$ on the side of the magnetic layer.

2. The magnetic recording medium of claim 1 wherein the electroconductive material contained in the magnetic layer is selected from carbon black, graphite and graphitized carbon black, and mixtures thereof.

3. The magnetic recording medium of claim 2 wherein the binder contained in the magnetic layer is a radiation-cured compound.

4. The magnetic recording medium of claim 1 wherein the magnetic powder is hexagonal barium ferrite.

5. A magnetic recording medium comprising a substrate, an undercoat layer on the substrate, and a magnetic layer formed on the undercoat and containing a hexagonal plate magnetic powder having an average particle diameter of 0.01 to 0.2 μm and a flakiness of at least 4, 9 to 30 parts by weight per 100 parts by weight of the magnetic powder of an electroconductive material, and a binder, wherein a fatty acid ester of a monobasic saturated or unsaturated fatty acid having 10 to 22 carbon atoms with a monohydric saturated or unsaturated alcohol having 2 to 22 carbon atoms is present at least on the surface of the magnetic layer remote from the substrate, and the medium has an electric resistance of up to $5 \times 10^9 \Omega/cm^2$ on the side of the magnetic layer.

6. The magnetic recording medium of claim 5 wherein the undercoat layer contains an electroconductive material and a binder.

7. The magnetic recording medium of claim 6 wherein the electroconductive material contained in the undercoat layer is selected from carbon black, graphite and graphitized carbon black, and mixtures thereof.

8. The magnetic recording medium of claim 7 wherein the binder contained in the undercoat layer is a radiation-cured compound.

9. The magnetic recording medium of claim 5 wherein the undercoat layer is a plasma-polymerized film.

10. The magnetic recording medium of claim 9 wherein the plasma-polymerized film contains 30 to 100 atom % of carbon.

11. The magnetic recording medium of claim 5 wherein the electroconductive material contained in the magnetic layer is selected from carbon black, graphite and graphitized carbon black, and mixtures thereof.

12. The magnetic recording medium of claim 11 wherein the binder contained in the magnetic layer is a radiation-cured compound.

13. The magnetic recording medium of claim 5 wherein the magnetic powder is hexagonal barium ferrite.

* * * * *